United States Patent
Skands et al.

(10) Patent No.: US 12,090,478 B2
(45) Date of Patent: Sep. 17, 2024

(54) MICROFLUIDIC PARTICLE ANALYSIS DEVICE

(71) Applicant: SBT Instruments A/S, Herlev (DK)

(72) Inventors: Gustav Erik Skands, Frederiksberg (DK); Christian Vinther Bertelsen, Frederiksberg (DK); Frederik Peter Aalund, Valby (DK)

(73) Assignee: SBT INSTRUMENTS A/S, Herlev (DK)

( * ) Notice: Subject to any disclaimer, the term of this patent is extended or adjusted under 35 U.S.C. 154(b) by 0 days.

(21) Appl. No.: 18/364,458

(22) Filed: Aug. 2, 2023

(65) Prior Publication Data
US 2024/0001360 A1    Jan. 4, 2024

Related U.S. Application Data

(62) Division of application No. 16/636,402, filed as application No. PCT/EP2018/071183 on Aug. 3, 2018, now Pat. No. 11,779,920.

(30) Foreign Application Priority Data

Aug. 4, 2017 (EP) ..................... 17184934

(51) Int. Cl.
*B01L 3/00* (2006.01)
*G01N 15/1031* (2024.01)
*G01N 15/14* (2024.01)

(52) U.S. Cl.
CPC .... *B01L 3/502715* (2013.01); *G01N 15/1031* (2013.01); *B01L 2300/0645* (2013.01);
(Continued)

(58) Field of Classification Search
None
See application file for complete search history.

(56) References Cited

U.S. PATENT DOCUMENTS

| 4,756,884 A | 7/1988 | Hillman et al. |
| 2007/0151852 A1 | 7/2007 | Chien et al. |

(Continued)

FOREIGN PATENT DOCUMENTS

| EP | 2259044 A1 | 12/2010 |
| WO | WO 2016/116535 | 7/2016 |

(Continued)

OTHER PUBLICATIONS

Chung et al., "Impedance Spectroscopy Flow Cytometry: On-Chip Label-Free Cell Differentiation", Cytometry Part A, 2005, 65A: 124-132.

(Continued)

*Primary Examiner* — Samuel P Siefke
*Assistant Examiner* — Henry H Nguyen
(74) *Attorney, Agent, or Firm* — John P. White

(57) ABSTRACT

The present invention relates to a microfluidic particle analysis device comprising an inlet and an outlet in fluid communication via a main channel defining a main flow direction from an inlet end to an outlet end, the main channel being defined by a main channel wall extending from the inlet end to the outlet end and having a first cross-sectional dimension in the range of 20 μm to 120 μm and a second cross-sectional dimension of at least 100 μm, the main (Continued)

channel wall at a vertex having an opening extending along the main flow direction and being open to an analysis section having surfaces at an analytical distance in the range of 5 μm to 50 μm and a sensor system for detecting a particle. The present invention also relates to a method of using the microfluidic particle analysis device for detecting particles or monitoring the concentration of particles.

16 Claims, 6 Drawing Sheets

(52) U.S. Cl.
CPC .............. *B01L 2300/0848* (2013.01); *B01L 2300/0877* (2013.01); *G01N 15/1484* (2013.01)

(56) References Cited

U.S. PATENT DOCUMENTS

| | | | |
|---|---|---|---|
| 2009/0148937 A1* | 6/2009 | Schnelli | G01N 15/1023 209/132 |
| 2010/0006441 A1 | 1/2010 | Renaud et al. | |
| 2010/0022680 A1 | 1/2010 | Karnik et al. | |
| 2011/0089328 A1 | 4/2011 | Li | |
| 2018/0038820 A1* | 2/2018 | Merino | G01N 27/3277 |
| 2020/0171496 A1 | 6/2020 | Skands et al. | |

FOREIGN PATENT DOCUMENTS

| | | |
|---|---|---|
| WO | WO 2016/163387 | 10/2016 |
| WO | WO 2017/181186 | 10/2017 |

OTHER PUBLICATIONS

Cheung et al., "Microfluidic Impedance-Based Flow Cytometry", Cytometry Part A, 2010, 77A: 648-666.

Clausen et al., "Coplanar Electrode Layout Optimized for Increased Sensitivity for Electrical Impedance Spectroscopy", Micromachines, 2015, 110-120.

David et al., "Viability and Membrane Potential Analysis of Bacillus megaterium cells by Impedance Flow Cytometry", Biotechnology and Bioengineering, 2011, 109: 483-492.

Gawad et al., "Dielectric spectroscopy in a micromachined flow cytometer: theoretical and practical considerations", Lab Chip, 2004, 4: 241-251.

Henrick Bruns, Oxford Master Series in Physics 1B, Oxford University Press, 2007, ISBN 978-0-19-923508-7.

Houssin et al., "Electrochemical impedance spectroscopy for detection of parasites in drinking water", IEEE Sensors 2009 Conference, 396-399.

Official Action dated Jul. 5, 2023 from the European Patent Office in corresponding European Patent Application No. 18 746 238.

International Search Report issued Oct. 23, 2018 in connection with PCT International Application No. PCT/EP2018/071183.

Written Opinion issued Oct. 23, 2018 in connection with PCT International Application No. PCT/EP2018/071183.

* cited by examiner

MICROFLUIDIC PARTICLE ANALYSIS DEVICE

This application is a divisional of U.S. Application Ser. No. 16/636,402, filed Feb. 4, 2020, now allowed, which is a § 371 national stage of PCT International Application No. PCT/EP2018/071183, filed Aug. 3, 2018, claiming priority of European Patent Application No. EP 17184934.2, filed Aug. 4, 2017, the contents of each of which are hereby incorporated by reference into the subject application.

FIELD OF THE INVENTION

The present invention relates to a microfluidic particle analysis device and to a method of detecting a particle in a fluid using the microfluidic particle analysis device. The device is useful for detecting and quantifying bacteria in drinking water, industrial process streams, in manually prepared liquid samples and in other liquids of similar viscosity, especially aqueous solutions.

PRIOR ART

Analysis of bacteria in relation to bioburden monitoring, food safety tests, hygiene, and cleaning validation, drinking water monitoring, etc., is a field where few sufficiently fast technologies currently exist that allow detection and quantification of bacteria in a sample in order to prevent product contamination and operational shutdowns caused by high levels of bacteria. Many bacteria tests typically require incubation or other time-consuming enrichment steps, which means that the fastest tests take at least 24 hours to provide results. Analysis methods that can give an indication of the bacteria level in a couple of hours do exist but this time frame is typically not sufficient. In most cases, samples must be sent to a laboratory. This severely limits the testing frequency due to high costs associated with having people handling and analysing samples.

In food safety testing as well as hygiene and cleaning validation of industrial equipment this means that infected food or equipment is often shipped to the next link in the supply chain before the bacteria measurement results are available to the operator. This work flow introduces a significant risk to food producers in the form of potentially having to issue very expensive product recalls. Contaminated food due to poor hygiene or infected produce leads to many deaths and hospitalizations every year on a worldwide scale.

For water utilities this means that water infected with dangerous bacteria will be supplied to citizens long before the test results are available. Bacterial contaminations can lead to infections involving vomiting and influenza-like symptoms, which may require hospitalisation. As a consequence of the slow analyses, pollutions of drinking water are often not discovered before citizens get sick.

In the case of hospitals, pharmaceutical companies, and other sensitive production facilities, undiscovered elevated bacteria levels lead to wasted resources, expensive counter measures or ultimately fatal consequences.

Ultimately, there is therefore a great need for improved fast monitoring of bacteria in many industries, where the response time should be minutes instead of hours or days.

Microfluidic devices are commonly employed for analysis and also for production purposes. Thus, U.S. Pat. No. 4,756,884 describes an analytical device for detecting the presence of an analyte in a physiological fluid sample. The device uses capillary force to draw a sample into the internal chambers of the device, and the capillary flow device may include a capillary acting as a pump.

US 2010/022680 provides microfluidic systems for producing polymeric drug delivery particles by nanoprecipitation using controlled mixing of polymeric solutions. The systems represent an example of the use of hydrodynamic flow focusing.

US2007151852 provides systems that utilise pressure driven flow in a first channel segment while providing substantially electrokinetically driven flow in another connected channel segment. The systems have independently controllable flow profiles, one that is pressure driven and another that is electrokinetically driven.

US 2011/089328 discloses an electrokinetic microfluidic flow cytometer apparatus. The system has a microchannel connecting an input port with an output port. The microchannel has signal and noise detection channels extending in opposite directions away from the microchannel to receive ambient electrical noise.

US 2010/006441 discloses a fluidic system comprising a space for containing a liquid and a lateral chamber in communication with the space. The lateral chamber contains an electrode that may be used to probe, measure, e.g. using impedance, or manipulate cells in the working zone. Various channel layouts are disclosed.

Several technologies exist for detecting particles, such as bacteria, suspended in a liquid. A commonly employed technology for detecting and quantifying cells in liquid in a laboratory is electrical impedance spectroscopy (EIS), also mentioned in literature as impedance flow cytometry (IFC). Thus, for example the review article Cheung et al. 2010 (*Cytometry Part A*, 2010, 77A: 648-666) summarises the background knowledge within the use of EIS in microfluidic systems.

Gawad et al. (*Lab Chip*, 2004, 4: 241-251) present theoretical considerations for a microfluidic flow cytometer using EIS to analyse cells. Characterisation of cells suspended in KCl solutions of 12,880 µS/cm conductivity is suggested, but no practical examples are shown.

The work of Gawad et al. is implemented into practice by Cheung et al. 2005 (*Cytometry Part A*, 2005, 65A:124-132). Cheung at al. 2005 study differentiation of red blood cells and derived components and beads of comparable sizes (i.e. about 5 µm in diameter). The fabrication and test of a microfluidic device are demonstrated, and it is shown how EIS using two different frequencies can be performed using the device. The device uses a flow-rate of 10 mm/s, and cells are suspended in phosphate buffered saline of high conductivity.

Houssin et al. (*IEEE SENSORS* 2009 *Conference*, 396-399) report the use of EIS in a microdevice for analysing oocysts of a parasite of the species *Cryptosporidium parvum* in water of low conductivity. David et al. (*Biotechnology and Bioengineering*, 2011, 109: 483-492) provide a comparison between flow cytometry and microfluidic EIS.

The above microfluidic EIS are not suited for the analysis of samples in industry or in non-research environments, as such samples often contain particles of many different sizes and properties, possibly mixed and unknown sample compositions. The used channel dimensions are small and would be prone to clogging if larger particles are present in the sample.

WO 2016/116535 discloses a microfluidic particle analysis device where a flow from an inlet is divided via an inlet manifold into a bypass channel and a measuring channel. The measuring channel may use EIS for detecting particles, which may be bacteria in drinking water or other liquids. The manifold divides the flow to appropriately use EIS in the measuring channel but the system is still prone to clogging by particles, particularly at the inlet of the measuring channel.

In light of the above it is an aim of the present invention to provide an improved microfluidic device for measuring particles, bacteria and other cells suspended in a liquid, in particular using EIS technology. The repeated use of a microfluidic device, either for measuring bacteria and/or particles in a flow stream over an extended period of time or for measuring bacteria and/or particles in many different unique samples is especially relevant for industrial applications, as it can significantly lower cost and improve ease of use, and the present invention seeks to address this issue.

DISCLOSURE OF THE INVENTION

The present invention relates to a microfluidic particle analysis device comprising an inlet and an outlet in fluid communication via a main channel defining a main flow direction from an inlet end to an outlet end, the main channel being defined by a main channel wall extending from the inlet end to the outlet end and having a first cross-sectional dimension in the range of 20 μm to 120 μm and a second cross-sectional dimension of at least 100 μm, which main channel has a first vertex opposite a second vertex, which vertices are located opposite each other in the second cross-sectional dimension, the main channel wall at the first vertex and/or the second vertex having an opening extending along the main flow direction, and the main channel wall along the opening being open to an analysis section having a first surface opposite a second surface at an analytical distance in the range of 5 μm to 50 μm and a sensor system for detecting a particle.

In a second aspect, the present invention relates to a microfluidic particle analysis device comprising an inlet and an outlet in fluid communication via a main channel defining a main flow direction from an inlet end to an outlet end, the main channel being defined by a main channel wall extending from the inlet end to the outlet end and having a cross-sectional area in the range of 5,000 μm² to 38,000 μm² and a cross-sectional dimension in the range of 20 μm to 500 μm, the main channel wall having an opening extending along the main flow direction, and the main channel wall along the opening being open to an analysis section having a first surface opposite a second surface at an analytical distance in the range of 5 μm to 50 μm and a sensor system for detecting a particle.

In use, a flow of liquid is led through the microfluidic particle analysis device, i.e. from the inlet to the outlet, and the liquid flowing through the microfluidic particle analysis device is analysed for a content of particles, e.g. the particles are "detected". The microfluidic particle analysis device can also be referred to as a flow system. When detection of particles is performed over time the detection may also be referred to as "monitoring" the particles, e.g. the content of particles in a liquid may be measured.

In general, a sensor for detecting particles requires the particle to pass the sensor at a limited flow rate for the particle to be detected, and with the present invention the microfluidic particle analysis device may be designed to match a desired sensor. The device of WO 2016/116535 has an inlet manifold, which splits an incoming flow into a bypass channel and a measuring channel according to the respective flow resistances of the two channels. However, in order to divert an appropriately sized flow into the measuring channel, the measuring channel is much smaller than the bypass channel and the inlet manifold may be blocked by particles. The present inventors have now surprisingly found that an inlet manifold is not needed in order to divert an appropriate stream into the analysis section. Thus, an opening extending along the main flow direction in the main channel wall will allow particles present in a liquid flowing through the microfluidic particle analysis device to enter the analysis section via the opening, thus permitting their detection. In a preferred embodiment, the microfluidic particle analysis device does not comprise a manifold, e.g. a section where the main channel is divided into two or more separate channels. In particular, the microfluidic particle analysis device does not comprise a bypass channel separate from a measuring channel.

In the context of the invention, a "manifold" is a channel layout where a channel is split into two or more channels in order to divide the flow into the two or more channels. The distribution of flow into the two or more channels via the manifold can be easily calculated by the skilled person from the flow resistances of the two or more channels. It is especially preferred that the microfluidic particle analysis device does not comprise a manifold providing parallel fluid communication from a first channel to a second channel and a further channel where the second channel has cross-sectional dimensions in the range of 1 μm to 50 μm.

The microfluidic particle analysis device of the invention may contain structures in the channels for manipulating the flow. For example, in an embodiment the microfluidic particle analysis device comprises a supply channel, e.g. with a first cross-sectional dimension in the range of 20 μm to 120 μm and a second cross-sectional dimension in the range of 200 μm to 1000 μm or more, which supply channel is divided into two or more main channels, each with a second cross-sectional dimension of at least 100 μm. Each main channel preferably has an opening and an analysis section as defined above. Downstream of the analysis sections the two or more main channels may be combined into a single exit channel. In a further embodiment, e.g. corresponding to the second aspect of the invention, the second cross-sectional dimension does not have a lower limit, e.g. it may be below 200 μm, and the supply channel is divided into two main channels each with a cross-sectional area in the range of 5,000 μm² to 38,000 μm² and having a cross-sectional dimension in the range of 20 μm to 500 μm. Thus, in this embodiment the cross-sectional area of the supply channel is at least 10,000 μm² so that it can be divided into two main channels with a cross-sectional area of at least 5,000 μm².

The microfluidic particle analysis device thus allows detection of a particle, e.g. a bacterium, yeast, or other eukaryotic cell, flowing past the sensor system. Since the microfluidic particle analysis device does not need a manifold or other obstacles to the flow, clogging can be significantly reduced when a manifold is not present in the microfluidic particle analysis device. Furthermore, the life time of the microfluidic device is consequently greatly prolonged.

The main channel is defined by a main channel wall extending from the inlet end to the outlet end. The shape of the cross-section of the main channel may be selected freely, but it can typically be defined by a first cross-sectional dimension and a second cross-sectional dimension. In the context of the invention, the cross-section will generally be defined in a plane normal to the main flow direction, and the first cross-sectional dimension will be perpendicular to the second cross-sectional dimension in the plane normal to the main flow direction. For example, the second cross-sectional dimension will typically be the largest observable cross-sectional dimension in the plane normal to the main flow direction, and the first cross-sectional dimension may be any cross-sectional dimension perpendicular to the second cross-sectional dimension in the plane normal to the main flow direction. However, it is also contemplated that the main channel may be round so that it can be described with a single cross-sectional dimension. Either cross-sectional dimension in the second aspect may be in the range of 20 µm to 500 µm. In the context of the invention the "main channel wall" may have any number of sides as appropriate according to cross-sectional shape of the main channel. The opening in the main channel wall may be in any surface of the main channel wall.

It is, however, generally preferred that the main channel has a first cross-sectional dimension in the range of 50 µm to 120 µm with a second cross-sectional dimension, which is as large as possible, e.g. at least 100 µm, such as at least 200 µm, such as at least 300 µm, e.g. in the range of from 200 µm to 300 µm, or at least 400 µm. In particular, in this aspect the cross-sectional area of the main channel is not limited to 38,000 µm$^2$. When the main channel has a first cross-sectional dimension in the range from 20 µm to 120 µm, e.g. in the range of 30 µm to 110 µm, or 40 µm to 100 µm, and a second, larger cross-sectional dimension, the cross-sectional shape may be chosen freely. For example, the cross-sectional shape may be rectangular or the cross-sectional shape may be elliptical, or the cross-section may have a shape corresponding to any combination of a rectangle and an ellipse. In this embodiment, regardless of the cross-sectional shape of the main channel, two points opposite each other in the second, larger cross-sectional dimension may be referred to as "vertices". A "vertex" may be at any section of the main channel wall having two wall surfaces with an angle between the two wall surfaces in the range of 10° to 180°, but typically at or less than 90°, e.g. In the range of 40° to 90°. Thus, the main channel has a first vertex opposite a second vertex, and the opening in the main channel wall is located in either of the vertices of the cross-sectional shape so that the analysis section is also located in the vertex. Alternatively, openings are located in both the first and the second vertex. Thus, in a specific embodiment the microfluidic particle analysis device has two analysis sections, e.g. located in opposite vertices. This embodiment provides a data output of higher quality than embodiments having only one analysis section. The present inventors have now surprisingly found that when the first cross-sectional dimension is at or below 120 µm, e.g. In the range of 50 µm to 120 µm, and the analysis section is located in the vertex of the cross-sectional shape, the presence of particles in the sensor system for detecting a particle is independent of flow rate through the main channel so that a proportional linearity between the number of detected particles and the flow rate is obtained and thereby the monitoring of particles, and thus measurement of particle concentration in a sample, is independent of the flow rate. Thus, when the first cross-sectional dimension is at or below 120 µm, such as up to 110 µm, or up to 100 µm, or up to 90 µm, or up to 80 µm, calibration of the microfluidic particle analysis device is simplified since the monitoring is independent on the flow rate. FIG. 1 compares the concentration of particles recorded in a microfluidic device of the invention having a main channel with a first cross-sectional dimension ("height") of 100 µm and a second, larger dimension ("width") of 220 µm, with the concentration of particles recorded in a microfluidic device having a main channel with a first cross-sectional dimension ("height") of 140 µm and a second, larger dimension ("width") of 350 µm. As is evident in FIG. 1 the particle concentration is independent of flow rate in the microfluidic particle analysis device of the invention.

It is further preferred that the main channel has a cross-sectional area in the range of 5,000 µm$^2$ to 38,000 µm$^2$. Regardless of the cross-sectional area, particles present in the flow through the microfluidic particle analysis device will enter the analysis section allowing their detection. The present inventors have now surprisingly found that when the cross-sectional area is at or below 38,000 µm$^2$, detection of particles in the sensor system for detecting a particle is independent of flow rate through the main channel so that a proportional linearity between the number of detected particles and the flow rate is obtained and thereby the monitoring of particles in a sample is independent of the flow rate (see FIG. 1). Thus, when the cross-sectional area is at or below 38,000 µm$^2$, calibration of the microfluidic particle analysis device is simplified since the detection is independent on the flow rate. When the cross-sectional area is higher than 38,000 µm$^2$, particles may still be detected, since they do enter the analysis section, but calibration of the microfluidic particle analysis device is more cumbersome since the flow rate must be taken into consideration.

As long as the main channel has a cross-sectional area at or below 38,000 µm$^2$, or if the main channel has a first cross-sectional dimension at or below 120 µm, e.g. In the range of 50 µm to 120 µm, and the analysis section is located in the vertex of the cross-sectional shape, detection of particles in the sensor system for detecting a particle is independent of flow rate through the main channel.

The microfluidic particle analysis device of the invention defines a main flow direction of the main channel, and the main channel has an opening to the analysis section, which opening extends along the main flow direction. In the context of the invention the term "along" means that the analysis section has an inlet near or at the inlet end of the main channel and an outlet near or at the outlet end of the main channel. However, the length of the analysis section is generally only limited by the sensor system for detecting a particle and the length of the analysis section may be chosen freely. Thus, the direction of the analysis section may be parallel with the main flow direction. However, the opening in the main channel wall may also divert from being parallel with the main flow direction. For example, the opening in the main channel wall may follow a straight line defining an angle in the range of 0° to 30° with the main flow direction. The opening may also have a helical shape around the main channel.

The main channel may also comprise openings for further analysis sections so that the microfluidic particle analysis device may comprise more than one analysis section. For example, the microfluidic particle analysis device may comprise, 2, 3, 4 or more analysis sections.

The analysis section has a first surface opposite a second surface at an analytical distance in the range of 5 µm to 50 µm, e.g. in the range of 10 µm to 20 µm. It is to be understood that the analytical distance between the first and the second surface is smaller than the first cross-sectional dimension of the main channel. In particular, the first cross-sectional dimension of the main channel should be at least twice, preferably at least five times, the analytical distance between the first and the second surface. This will allow a sufficient limitation of the flow rate of the particles in the analysis section for the particles to be detected.

In general, the analytical distance between the first and the second surface is matched to the size of particles intended to be detected. The first surface and the opposite second surface are preferably parallel to each other.

The cross-sectional dimension of the opening in the main channel wall, e.g. the dimension perpendicular to the main flow direction, will typically be the same as the analytical distance between the first surface and the opposite second surface of the analysis section. However, it is also contemplated that the opening may have a dimension larger than the analytical distance between the first surface and the second surface.

The analysis section of the microfluidic particle analysis device has a back wall opposite the opening in the main channel wall. In general, the distance between the opening in the main channel wall and the back wall should be at least 10 µm in order to make room for the sensor system for detecting a particle. However, as long as there is room for the sensor system for detecting a particle, the distance from the opening in the main channel wall to the back wall may be chosen freely. In general, it is preferred that the distance from the opening in the main channel wall to the back wall is in the range of 10 µm to 50 µm, e.g. 20 µm to 30 µm. The sensor system for detecting a particle is preferably positioned, i.e. in the analysis section, at a perpendicular distance from the opening of at least 5 µm, e.g. at a perpendicular distance in the range of 5 µm to 20 µm. For example, when the sensor system for detecting a particle comprises electrodes, the perpendicular distance from the opening in the main channel wall to the electrodes should be at least 5 µm, such as at least 10 µm.

The length of the main channel, e.g. the distance from the inlet end to the outlet end, may be chosen freely. However, for practical reasons the distance should be at least 500 µm. In order to avoid unnecessary pressure drops over the main channel it should not be longer than 30,000 µm.

The length of the analysis section, e.g. the opening, may be chosen freely. However, the analysis section should be long enough to accommodate the sensor for detecting a particle. In an embodiment the opening, and thereby also the analysis section, extends from the inlet end to the outlet end of the main channel. In another embodiment the distance from the inlet end to the outlet end is in the range of 200 µm to 30,000 µm, e.g. 500 µm to 30,000 µm. For example, the opening may extend from the inlet end to the outlet end of the main channel and have a length in the range of 200 µm to 30,000 µm or 500 µm to 30,000 µm. In an embodiment the opening is shorter than the distance from the inlet end to the outlet end. For example, the opening may have an extension in the main flow direction in the range of 10 µm to 5000 µm.

The inlet of the microfluidic particle analysis device is supplied with liquid using any channel design as desired, and likewise the liquid is removed from the outlet using any channel design as desired. In general, liquid may enter the microfluidic particle analysis device at an inlet point upstream of the inlet end of the main channel, and liquid may exit the microfluidic particle analysis device at an outlet point downstream of the outlet end of the main channel. In an embodiment, the microfluidic particle analysis device comprises a supply channel providing fluid communication from the inlet point to the inlet end of the main channel and an exit channel providing fluid communication from the outlet end of the main channel to the outlet point. In general, the supply channel and the exit channel will have the same or a larger cross-sectional area than the main channel.

In a specific embodiment, the microfluidic particle analysis device comprises a supply channel in parallel fluid communication with two main channels, each having an analysis section as defined above, which analysis sections in turn are in fluid communication with an exit channel. When the microfluidic particle analysis device comprises a supply channel in fluid communication with two, or more, main channels, each having an analysis section, e.g. one or two analysis sections, it is possible to achieve statistical evidence faster for an analysed sample so that faster analysis is obtained when performing particle and cell concentration measurements. This also allows measurement of particles at a lower concentration than for a microfluidic particle analysis device having only a single analysis section.

Moreover, when a supply channel is included it may lower the overall hydraulic resistance of the microfluidic particle analysis device. Due to practical constraints on the minimum length of the main channel, the addition of a supply channel, and optionally also an exit channel, may be the only way to lower the hydraulic resistance of the microfluidic particle analysis device to desired levels. In a specific embodiment, the microfluidic particle analysis device comprises a supply channel in fluid communication with two main channels having different cross-sectional areas. This will provide higher data quality, since the same liquid is simultaneously analysed under different linear flow rates in the two main channels.

Without being bound by any particular theory the present inventors believe that the non-Stokes flow when the Reynolds number approaches 1, and thus the inertia of the water, will promote deposition of the particles, particularly during sudden directional changes of the flow, for example when a measuring channel is split off from a main channel. The analysis section of the microfluidic particle analysis device of the present invention does not contain any sudden directional changes in the flow through the device, thus deposition of particles caused by this effect is minimal. With a reduced risk of deposition, and thereby clogging, the microfluidic particle analysis device allows monitoring, even long term monitoring, of liquid streams with much higher particle contents than expected in e.g. drinking water and other sources traditionally considered to be clean. For example, the microfluidic particle analysis device may be used for continued monitoring of the content of bacteria, yeasts, filamentous fungi, plant cells, e.g. algae or mosses, etc. in industrial fermentations where the cell count is much greater than in drinking water, without the risk of deposition of cells or other particles. The reduced risk of deposition, and thereby clogging, is also advantageous when the microfluidic particle analysis device to be used for batch measurements, i.e. measurements where a single manually prepared sample is analysed since an extended number of batch measurements can be performed without maintenance or exchange of microfluidic components.

The sensor system for detecting a particle may be any sensor system capable of detecting a particle, and in particular by having an analytical distance between the first surface and the second surface in the range of 5 µm to 50 µm, particles in the size range of 0.1 µm to 20 µm, e.g. bacteria or eukaryotic cells, can be detected. With this analytical distance between the first surface and the second surface, electrical impedance spectroscopy (EIS) is available as a detection system, although any measuring principle may be used. Other detection principles are optical detection or detection using fluorescence. The particle may be any microparticle. In particular, the particle may have a size in the range of from 0.1 µm to 20 µm, such as 0.5 µm to 5 µm. The particles may be biological cells, such as prokaryotic cells, e.g. bacteria, or eukaryotic cells, e.g. yeasts, protozoans, parasites, amoebae, plant cells, e.g. algae or mosses, or mammalian cells, e.g. blood cells, or recombinant eukaryotic production cells, e.g. Chinese hamster ovary cells or insect cells. Other relevant particles may be rust particles or other particles occurring from corrosion.

The sensor system will generally have a defined detection limit so that when the concentration of particles surpasses the detection limit the sensor system may trigger an alarm. The detection limit can be set freely as required by the specific use of the sensor system, but it will depend on the liquid and sample to be monitored and the particles suspected of being contained in the liquid. For example, for purified water (PW) the detection limit may be in the range of 1 ml$^{-1}$ to 100 ml$^{-1}$ or lower, e.g. 10 ml$^{-1}$. For drinking water, depending on the source of drinking water and possible contaminations, the detection limit may also be higher, e.g. in the range of 1,000 ml$^{-1}$ to 10$^7$ ml$^{-1}$, such as 10,000 ml$^{-1}$ to 1,000,000 ml$^{-1}$.

The sensor system may also monitor particles in a liquid sample, e.g. a single limited volume sample, such as for measuring the concentration of particles in a liquid sample.

The microfluidic particle analysis device is contained in a substrate, and any appropriate substrate material may be employed. The channels can be formed in the substrate using any technology appropriate for the specific substrate. For example, the substrate may be glass, e.g. a glass wafer, or silicon, e.g. a silicon wafer, and the channels can be formed using lithographic or etching techniques.

Lithographic or etching techniques may be used to prepare channels of the same height, but it is generally preferred to fabricate the main channel and analysis section with different heights. This can be achieved by, for example, using an isotropic or anisotropic etch to vary the height of the main channel throughout the design to change the hydrodynamic resistance of the main channel. In an embodiment, a design can be made in which the supply channel and/or the exit channel is deeper than the main channel by combining e.g. hydrofluoric acid (HF) etch of the supply channel in glass and dry etch to form the main channel. The substrate may also be a polymeric material, and the channels may be formed using, e.g. micromaching, micromoulding, microinjection moulding, laser ablation, 3D printing etc. Lithographic or etching techniques allow much lower tolerances than macrofabrication resulting in each design being identical and thus practically eases any large-scale manufacturing of the resulting product tremendously. Thus, in a specific embodiment the features in the microfluidic particle analysis device, e.g. the width and the height of the channels, have tolerances of about ±2 µm, e.g. about ±1 µm. These tolerances allow that the concentration of particles of a liquid entering the system is determined more accurately than in a system with higher tolerances. However, the method of manufacture may be chosen freely and in another embodiment the tolerances are about +5 µm.

Systems, especially flow systems, for detection of microparticles will generally have channels of sizes in the same order of magnitude as the particles to be detected in the systems, e.g. with a cross-sectional dimension in the range of from 1 µm to 50 µm, at locations where particles are detected. Such a channel will have a hydrodynamic resistance, and the concept of hydrodynamic resistance may be considered an analogue to the electrokinetic law between voltage potential and current, Ohm's law, so that the flow rate, Q, in a channel is related to the applied pressure drop across the channel, ΔP, and hydrodynamic resistance, R, in the following manner: ΔP=R·Q. Microfluidic channels are of small dimensions, e.g. <1 mm, and thus will always have significant hydrodynamic resistances. For a microchannel of rectangular cross-section, the hydrodynamic resistance can be approximated using Equation 1:

$$R \cong \frac{12\,\mu L}{wh^3\left(1 - \frac{0.630h}{w}\right)} \quad \text{Equation 1}$$

where µ is the dynamic viscosity, L is the length of the channel, w is the width of the channel, and h is the height of the channel. Equation 1 is valid when h<w but may also be used to approximate the hydrodynamic resistance when h≈w. However, a better approximation of the hydrodynamic resistance when h≈w can be obtained using Equation 2:

$$R \cong \frac{28.4\,\mu L}{h^4} \quad \text{Equation 2}$$

Throughout this document the term "height" is used to describe the cross-sectional dimension of a structure, e.g. a channel, perpendicular to the plane defined by the width and the length of the structure. However, the height may also be referred to as a "depth" and the two terms may be used interchangeably. The terms "height" and "depth" will typically correspond to the first cross-sectional dimension of the main channel, and the "width" will typically correspond to the second cross-sectional dimension of the main channel, also when the main channel is not rectangular. Thus, when the cross-section of the main channel, e.g. the cross-section in a plane normal to the main flow direction, deviates from rectangular, the height or depth will normally describe the largest cross-sectional dimension in the first cross-sectional dimension. Calculations for the approximation of hydrodynamic resistances are well-known to the skilled person as shown for example by Theoretical Microfluidics (Henrik Bruus, 2007, Oxford Master Series in physics 18, Oxford University Press, ISBN 978-0-19-923508-7), the contents of which are hereby incorporated by reference; in particular chapters 1, 2, 3, 4 and 6.

The large hydrodynamic resistance of a microfluidic system is an issue for external pressure-inducing components, e.g. for applying a flow through the microfluidic system. Due to the hydrodynamic resistance, a single microfluidic channel can require 1 to 20 bar of differential pressure to obtain the desired flow rate in the channel. For example, a single channel with cross-sectional dimensions of 10 µm×10 µm and a length of 2 cm has a pressure drop of 9.2 bar at a flow rate of 2 µl/min. A pressure requirement of more than 5 bar limits the choice of pressure-inducing units, which can be a significant challenge if the manufactured system is cost sensitive or needs to be very reliable. This is especially relevant for pumps that dispense volumes in the order of µl/min to ml/min, as very expensive products will function at high back-pressures, but are not relevant for mass production due to cost. This problem becomes even more relevant in the context of analysis of media such as drinking water, where it is desirable to monitor large volumes, e.g. thousands of cubic meters. Likewise, this problem is also relevant for monitoring industrial process streams. In terms of the present invention "monitoring" does not require that the total volume of the liquid to be monitored is passed through the microfluidic particle analysis device, and analysis of a fraction of the total volume is considered to give a representative result for the total volume of liquid.

Moreover, for channels in this scale, e.g. having cross-sectional dimensions of about 1 mm or less, liquids flowing in the channels are predominantly limited to flowing in the laminar regime as may be seen from a calculation of the Reynolds number. The laminar flow means that a liquid flowing in a microchannel will be under "no-slip" conditions where the linear velocity of the liquid at the wall of the microchannel will be zero. No-slip conditions are especially challenging for the analysis of particles present in the flow since the no-slip conditions will result in an inhomogeneous flux distribution of the particles over the cross-section of a microchannel. For the analysis of particles present in low concentrations, e.g. in the detection of bacteria in food safety testing, drinking water or in Purified Water (PW), an inhomogeneous distribution of the bacteria may result in false negative results or false positive results depending on the algorithms used for detection.

The present inventors have now surprisingly found that despite the no-slip boundary conditions, the microfluidic particle analysis device of the invention allows accurate detection and monitoring of particles in the analysis section when a liquid comprising particles is applied to the inlet of the microfluidic particle analysis device.

The microfluidic particle analysis device comprises an inlet in fluid communication with the main channel. The inlet may have any design allowing connection to an external supply of liquid for analysis, e.g. via an inlet point. For example, the inlet point may comprise a tubular connection having an inner diameter in the range of 100 µm to 3000 µm, e.g. 1300 µm or 850 µm. The inlet point may also comprise a device for creating a flow of liquid in the microfluidic particle analysis device, such as a pump. When the microfluidic particle analysis device comprises a pump, any type of pump may be used, and in particular the pump can provide a liquid flow in the range of 100 µl/min to 1000 ml/min, e.g. 100 µl/min to 1 ml/min, or 1 ml/min to 10 ml/min.

In the microfluidic particle analysis device of the invention only a small fraction of the flow in the main channel will enter the analysis section, but as explained above a proportional linearity between the number of detected particles and the flow rate is never the less obtained. This allows for the use of a large linear flow rate in the main channel, and thereby a correspondingly large volumetric flow rate may be applied to the microfluidic particle analysis device. For example, when a volumetric flow rate of 1 ml/min is applied to a main channel having a cross-sectional area of 30,000 µm² the linear flow rate in the main channel is 0.56 m/s, and the linear flow rate in the analysis section will be low enough for detection of particles, e.g. using EIS (see FIG. 1). In general, the linear flow velocity in the main channel will be in the range of 10 mm/s to 10 m/s. In a specific embodiment, an external circumventing section is employed where a flow of 150 ml/min is diverted so that 1 ml/min enters the microfluidic particle analysis device and the rest is diverted through the external circumventing section.

In another embodiment the external components comprise a filtering unit for removing particles larger than a cut-off value. The cut-off value may be selected based on the purpose of the microfluidic particle analysis device, e.g. with respect to the size of particles for analysis, so that particles above the cut-off value are removed from the liquid prior to entry into the microfluidic particle analysis device. For example, the filtering unit may have a cut-off value in the range of 10 µm to 200 µm, such as 20 µm to 100 µm, e.g. 40 µm or 100 µm. However, since the analysis section is located in an opening in the main channel wall large particles, e.g. in the range of 10 µm to 100 µm, are generally not problematic, since these will pass through the system without influencing detection of particles of interest in the analysis section. Thus, in an embodiment the microfluidic particle analysis device does not comprise filtering unit, in particular a filtering unit having a filter with a cut-off in the range of 10 µm to 100 µm.

When the main channel has a first cross-sectional dimension, which is smaller than a second cross-sectional dimension, the second cross-sectional dimension and the main flow direction typically define a plane so that the main channel has a "planar design". In an embodiment the inlet is in fluid communication with the main channel via a channel at an angle to the plane of the main channel, e.g. a channel, which is orthogonal to the plane of the planar design. Thus, the liquid to be analysed in the microfluidic particle analysis device is applied at an angle, e.g. orthogonally, to the planar design of the channels in the microfluidic particle analysis device. Having the inlet at an angle to the plane of the planar design generally simplifies connection of the microfluidic particle analysis device to external components, such as pumps or tubes. Likewise, manufacture of the microfluidic particle analysis device is simplified in this embodiment.

In another embodiment the inlet is in plane with the planar design of the main channel. Application of the liquid to be analysed in plane with the planar design of the microfluidic particle analysis device is advantageous since it can minimise deposition of particles prior to the liquid's entry into the main channel. For example, when the inlet is orthogonal to the plane of the microfluidic particle analysis device, particles may be deposited where the inlet meets the main channel or the inlet manifold, however, this is prevented when the inlet is in plane with the planar design so that "inlet sedimentation" is prevented. Prevention of inlet sedimentation is especially advantageous for a microfluidic particle analysis device for monitoring particles, e.g. bacteria, yeasts, plant cells, etc. in an industrial process stream, e.g. a stream from a fermenter. The reduced risk of inlet sedimentation is also relevant in the analysis of individual samples from industrial process stream with high concentrations of cells, e.g. bacteria, yeasts, or plant cells from a fermenter. Thus, the microfluidic particle analysis device is especially suited for monitoring particles at a concentration in the range of $10^6$ ml$^{-1}$ to $10^8$ ml$^{-1}$.

Reduction of inlet sedimentation is particularly important for devices that are not for single use in relation to detection of bacteria, as stationary, e.g. sedimented, bacteria can grow where sedimented and thus influence the concentration in subsequent measurements thereby generating false positive results. Furthermore, when external components comprise flow sections of larger cross-sectional areas than the main channel and the optional supply channel, the linear flow velocity in the external section is decreased compared to the linear flow velocity in the microfluidic particle analysis device, and the decreased linear flow velocity may create spaces where particles can settle so that their entry into the microfluidic particle analysis device is delayed or even hindered, which is undesirable. The microfluidic particle analysis device of the present invention advantageously allows that high volumetric flow rates are applied, e.g. 1 ml/min or more, since the linear flow rate in the analysis section will be sufficiently low for detecting and monitoring particles, so that the linear velocity through the device will generally be high, e.g. above 0.1 m/s, or above 1.0 m/s, which reduces sedimentation.

The microfluidic particle analysis device comprises an outlet in fluid communication with the outlet end of the main channel. The main function of the outlet is thus to provide an outlet for the liquid in the microfluidic particle analysis device, the outlet not being particularly limited. The inlet and the outlet may be identical so that the microfluidic particle analysis device can be described as "symmetrical" with respect to the flow through the system, and the "inlet" may be used as an "outlet", and vice versa. This ensures that operation at reverse flow can be applied to the device in order to remove particles that may have settled in the system. For example, after operation, the flow may be briefly reversed to remove settled particles. The flow may also be reversed more frequently, e.g. during a measurement, which may increase the life time of the microfluidic particle analysis device since build-up of particles can be limited. A symmetrical design furthermore simplifies manufacture.

It is preferred that the outlet, e.g. via an outlet point, comprises a device for connecting to external components, such as additional tubes, an auxiliary pump or the like. It is further preferred that the hydrodynamic resistance of the outlet point and any external components is insignificant compared to the hydrodynamic resistance of the microfluidic particle analysis device.

It is preferred that the overall hydrodynamic resistance of the microfluidic particle analysis device is as low as possible. Thus, in a preferred embodiment the main channel has a length corresponding to the minimal length required for housing the sensor system for detecting a particle in the analysis section. It is furthermore preferred that the analysis section, e.g. the opening, has a length corresponding to the minimal length required for housing the sensor system for detecting a particle. For example, the length of the analysis section, e.g. as represented by the opening, may be in the range from 10 µm to 5000 µm, e.g. 100 µm to 2000 µm, such as 1000 µm, or 20 µm to 500 µm. It is preferred that the cross-sectional areas of external components and the main channel are approximately of the same order of magnitude, e.g. within a few orders of magnitude.

The analysis section may have a first surface opposite a second surface at an analytical distance in the range of 5 µm to 50 µm, and the distance between the opening in the main channel wall and the back wall may be in the range of 5 µm to 50 µm. For example, the analytical distance between the first surface opposite the second surface may be in the range of 10 µm to 20 µm, and the distance between the opening in the main channel wall and the back wall may be in the range of 10 µm to 20 µm. For detection of bacteria the analytical distance between the first and the second surface may be about 10 µm. With an analysis section in this size the Reynolds number will be about 1 or less than 1 under flow conditions, e.g. at appropriate flow velocities, of relevance in the context of the invention. Traditionally in microfluidics the flow is assumed to be Stokes flow. However, when the Reynolds number is in the order of 1 or more than 1 the flow may be referred to as a non-Stokes flow; in a non-Stokes flow inertial forces become relevant, which is important for a flowing liquid containing particles.

Moreover, a special Reynolds number, $R_p$, may also be calculated for particles flowing in a channel according to Equation 3:

$$R_p = \mathrm{Re} \times \frac{a^2}{D_h^2} \quad \text{Equation 3}$$

where Re is the Reynolds number, a is the particle diameter, and $D_h$ is the hydraulic diameter of the channel. When $R_p$ is in the order of 1 an inertial focusing of particles will be observed so that when a channel has a first cross-sectional dimension in the range of from 50 µm to 300 µm and a second cross-sectional dimension in the range of from 50 µm to 300 µm, particles of about 10 µm or more will be inertially focused in the channel. However, for particles of about 1 µm to 2 µm in diameter, $R_p$ will typically be about 0.01 to 0.3, in particular in the range of 0.01 to 0.2, when in the laminar flow regime, and inertial forces are expected not to contribute significantly to the movement of the particles. Thus, large microparticles are expected not to enter the opening with the analysis section due to inertial forces, and small microparticles are expected to enter the opening with the analysis section due to the lack of inertial forces, i.e. regardless of the cross-sectional dimensions and area of the main channel, but the present inventors have surprisingly found that despite being operated in a laminar flow regime with negligible influence of inertial forces, microparticles present in the liquid for analysis do not enter the analysis section for detection with proportional linearity with respect to the flow rate when the cross-sectional dimensions are outside the ranges of the microfluidic device of the present invention, i.e. when the first cross-sectional dimension is above 120 µm with an analysis section in a vertex of the main channel, or when the cross-sectional area is above 38,000 µm² and the analysis section is not located in a vertex. However, when the microfluidic particle analysis device is according to either of the two aspects of the invention the particles can be detected with a proportional linearity between the number of detected particles and the flow rate as explained above. In particular, when the cross-sectional area of the main channel is at or less than 38,000 µm² or when the main channel has a first cross-sectional dimension in the range of from 50 µm to 120 µm, and a larger second cross-section dimension, and the analysis section is located in the vertex of the main channel, particles can be detected and measured independently of the flow rate in the main channel (as shown in FIG. 1). It is, however, also contemplated that the opening in the main channel wall is not limited to a corner for the proportional linearity to be observed; the opening may also be at any section of the main channel wall having two wall surfaces with an angle between the two wall surfaces in the range of 40° to 180°. In the context of the invention, this is considered a vertex.

The microfluidic particle analysis device is generally suited for use with a volumetric flow in the range of from 30 µl/min to 30 ml/min applied to the inlet or the inlet point of the microfluidic particle analysis device. For example, the volumetric flow rate of the microfluidic particle analysis device may be in the range of 100 µl/min to 10 ml/min, e.g. 0.5 ml/min to 5 ml/min or 30 µl/min to 1 ml/min, e.g. 50 µl/min to 500 µl/min. In a specific embodiment, the microfluidic particle analysis device comprises a pump for providing a liquid flow in the range of 100 µl/min to 1000 ml/min. The flow rate in the main channel may also be expressed as a linear flow velocity, and it is preferred that the linear flow velocity in the main channel is in the range of 10 mm/s to 10 m/s, e.g. 100 mm/s to 1,000 mm/s, or 0.1 m/s to 10 m/s.

The microfluidic particle analysis device may further comprise an external circumventing section, in particular when the cross-sectional dimensions of the analysis section are in the range of 5 µm to 20 µm, and/or when the cross-sectional area of the main channel is low, e.g. 25,000 µm² or less. An external circumventing section may comprise an inlet branch, e.g. upstream of the inlet or inlet point of the microfluidic particle analysis device, for dividing a liquid flow into an analysis stream, for application to the microfluidic particle analysis device, and a circumvention stream that will not enter the microfluidic particle analysis device.

For example, when the cross-sectional dimensions of the main channel are in the range of from 50 µm to 300 µm, the circumventing section, e.g. the tubes of the circumventing section, may have cross-sectional dimensions in the range of 200 µm to 3,000 µm, e.g. 850 µm to 1300 µm. The cross-sectional area and length of the circumventing section may be chosen to divert a predetermined amount of the flow, e.g. from 80% to 90% or more, into the circumventing section. An external circumventing section may be integrated with a pump and may take the form of a flow-splitter. The external circumventing section allows that the microfluidic particle analysis device is operated at a higher volumetric flow rate, since it allows that a smaller proportion of the liquid for analysis being applied to the microfluidic particle analysis device and thereby the linear flow velocity, in particular in the measuring channel, can be controlled to be in a range desirable for the sensor for detecting a particle. However, since the linear flow rate in the analysis will be much smaller than the linear flow rate of the main channel, as explained above, it is preferred that the microfluidic particle analysis device of the invention does not comprise the external circumventing section. A microfluidic particle analysis device not having an external circumventing section is cheaper to manufacture than a microfluidic particle analysis device requiring an external circumventing section.

In an embodiment of the invention the sensor system for detecting a particle employs EIS for detecting particles. EIS in the context of microfluidic systems is reviewed by Cheung et al. 2010 (*Cytometry Part A*, 2010, 77A: 648-666), which is hereby incorporated by reference. Thus, in an embodiment of the invention the microfluidic particle analysis device has a particle detection system comprising a first electrode and a second electrode defining an operating space between the first electrode and the second electrode, which first and second electrodes are in electrical connection via an electric circuit comprising an alternating current (AC) or a direct current (DC) source, and a device for monitoring an electrical signal from the first and/or the second electrode. EIS in a flow system, in particular for the detection of bacteria in liquid samples, is limited by the fact that cross-sectional dimensions of a section housing the electrodes are controlled by the size of the particles to be detected. For example, an EIS system for the detection of bacteria should have at least one cross-sectional dimension of about 20 µm or less, e.g. about 10 µm, in a channel housing the EIS electrodes, since EIS electrodes in a larger channel may not detect a bacterium in the channel. The microfluidic particle analysis device of the present invention is particularly advantageous for the analysis of larger volumes of liquids, e.g. 1 ml to 100 ml, since the presence of the analysis section at an opening in the main channel wall allows that only a fraction of the total volume of liquid applied to the main channel enters the analysis section thereby making EIS possible. This allows that the microfluidic particle analysis device is employed with a total volumetric flow of up to about 30 ml/min, which is suitable for a device for screening liquid samples. It is furthermore advantageous that the stream of liquid diverted into the analysis section allows detection and measuring of particle concentrations in the liquid independently of the flow rate of the liquid in the main channel. The microfluidic particle analysis device further allows that EIS is employed for the detection of particles without requiring hydrodynamic focusing or without positioning the particles using dielectrophoretic focusing. Thus, in an embodiment of the invention the microfluidic particle analysis device does not employ hydrodynamic focusing. In another embodiment the microfluidic particle analysis device does not employ dielectrophoretic focusing.

Neither dielectrophoretic focusing, hydrodynamic focusing nor other focusing effects are, however, ruled out, and both principles may be used in the microfluidic particle analysis device.

The first and the second electrode may be on the same surface of the analysis section, e.g. the first and the second electrode may be in a "coplanar" set-up, or the first and the second electrode may be positioned on opposite surfaces in the analysis section, e.g. the first and the second electrode may be in a "parallel overlap" set-up. When the two electrodes are coplanar the operating space is parallel to the direction of the flow in the analysis section, and the operating space is the distance between the electrodes, i.e. from the edge of the first electrode to the edge of the second electrode. The operating space of coplanar electrodes may be in the range of from 1 µm to 50 µm, e.g. 1 µm to 20 µm.

When the two electrodes are in a parallel overlap set-up the operating space is equal to the analytical distance between the first and the second surface with due consideration of the thickness of the electrodes. In general, the electrodes are flush with the surface, although the electrodes may rise up to about 1 µm, typically up to about 500 nm, e.g. 200 nm, from the surface, which is considered not to impact the behaviour of the liquid in the microfluidic particle analysis device so that no effects are caused by such electrodes. The first and the second electrode are generally of the same size, e.g. with superficial dimensions in the range of 1 µm to 100 µm, e.g. 5 µm to 50 µm, although the first and the second electrode may also have different sizes. The electrodes may be of any conducting material but are generally metallic, e.g. prepared from titanium, gold, nickel, copper, iridium, platinum, palladium, or combinations and alloys thereof.

In an embodiment the sensor system for detecting a particle comprises electrodes for EIS and there is a perpendicular distance from the opening in the main channel wall to the excitation electrode and to the reference electrode or reference electrodes of at least 5 µm. For example, the distance from the opening in the main channel wall to the back wall may be in the range of 10 µm to 50 µm. It is preferred that the electrodes are in a parallel overlap set-up but the distance of at least 5 µm, e.g. 10 µm, is also relevant for electrodes in a co-planar set-up. By having a distance of at least 5 µm to the opening in the main channel wall the presence of the electrical field in the main channel is minimised and fabrication tolerances are more easily handled. Thereby, particles in the main channel and close to the opening in the main channel will not enter the electrical field and will not influence detection of particles in the analysis section.

The electrodes are in electrical connection via an electric circuit comprising the AC or DC source and a device for monitoring an electrical signal. The electrical circuit may comprise conductors, which are integrated with the microfluidic particle analysis device, e.g. in the substrate of the microfluidic particle analysis device.

The AC or DC source may be chosen as appropriate, and an AC source may provide frequencies in the kHz to MHz range, e.g. from 100 kHz to 100 MHz. The voltage between the first and the second electrode will typically be in the range of 0.1 V to 10 V, e.g. 0.5 V to 5 V. The device for monitoring an electrical signal may comprise a processing device for analysing a signal recorded from the electrodes. The device for monitoring an electrical signal may further comprise an output device for displaying or transferring data from the device for monitoring the electrical signal.

A device for transferring data may operate using any wireless or wired data transmission protocol.

In use, a voltage is applied to the first electrode and a current is measured at the second electrode. The first electrode may also be referred to as the "excitation electrode", and the second electrode may also be referred to as the "reference electrode". The measured current is recorded, e.g. continuously, at a predetermined sample rate. When a liquid without any particles passes the electrodes, e.g. the operating space, the reference electrode will provide a "base signal", and when a particle, such as a biological cell, e.g. a bacterium, passes the operating space the signal will change.

In a specific embodiment the electrodes are arranged in a coplanar set-up, and the particle detection system comprises an excitation electrode located between two reference electrodes. The measurements electrodes comprise a first reference electrode upstream of the excitation electrode and a second reference electrode downstream of the excitation electrode. In this embodiment the operating space is divided into an onset operating space between the first reference electrode and the excitation electrode and a balance operating space between the excitation electrode and the second reference electrode. In use, a voltage is applied to the excitation electrode and a current is measured at the two reference electrodes. A particle passing through the operating space will first encounter the onset operating space where its presence will be recorded by a change in the signal between the excitation electrode and the first reference electrode. When the particle is in the onset operating space no change in the signal will be recorded between the excitation electrode and the second reference electrode, but when the particle reaches the balance operating space its presence will be recorded by a change in the signal between the excitation electrode and the second reference electrode, whereas no change in the signal will be recorded between the excitation electrode and the first reference electrode. This allows that the same particle is recorded twice by the electrode set-up, and thereby the velocity of a particle can be measured. Measurement of the particle velocity allows that the overall flow velocity, e.g. the linear flow velocity, of the liquid in the measuring channel is estimated. Thus, this embodiment allows that the flow rate through the microfluidic particle analysis device is estimated. Knowledge of the fluid velocity in the measuring channel further provides a better estimate of the concentration of particles in the liquid than can be recorded when only a single reference electrode is employed, since the signals can be correlated with the estimated fluid velocity.

This same effect can be obtained when the particle detection system comprises two or more sets of electrodes arranged in a parallel overlap set-up, wherein a first, i.e. upstream, set of electrodes define an onset operating space and a second, i.e. downstream set of electrodes define a balance operating space. In both embodiments the size of the onset operating space and the balance operating space may be the same, or the sizes may differ from each other. When two sets of electrodes in a parallel overlap set-up are employed the distance between the two sets of electrodes will typically be in the range of 5 µm to 50 µm, e.g. 10 µm to 20 µm.

In another aspect the invention relates to a method of detecting a particle in a fluid, the method comprising: providing a microfluidic particle analysis device according to the invention, providing a sample fluid suspected of containing a particle having a dimension in the range of from 0.1 µm to 20 µm, applying a flow of the sample fluid from the inlet to the outlet of the microfluidic particle analysis device, detecting a particle in the measuring channel using the sensor system for detecting a particle.

Any microfluidic particle analysis device of the invention may be used in the method, but it is preferred that the microfluidic particle analysis device, as outlined above, comprises a first electrode and a second electrode defining an operating space between the first electrode and the second electrode, which first and second electrodes are in electrical connection via an electric circuit comprising an AC or a DC source and a device for monitoring an electrical signal from the first and/or the second electrode. This embodiment comprises the further steps of applying an AC or DC current from the current source to create an electric field in the operating space, and monitoring a differential electrical signal between the first and the second electrode.

The microfluidic particle analysis device is particularly suited for analysing bacteria in different liquid samples, e.g. in drinking water, in industrial water, other aqueous solutions or in specifically prepared samples. However, the method is not limited to any particular sample liquid and the method may be used to detect a particle in any appropriate liquid. Preferred particles are biological cells as outlined above. In a preferred embodiment, the sample fluid suspected of containing a particle contains particles at a concentration in the range of 0 ml$^{-1}$ to 10$^8$ ml$^{-1}$, e.g. 100 ml$^{-1}$ to 10$^6$ ml$^{-1}$, such as 1000 to 10$^5$ ml$^{-1}$. When the sample fluid suspected of containing a particle is drinking water, the concentration of particles, e.g. bacteria, will typically be in the range of 0 ml$^{-1}$ to 10$^5$ ml$^{-1}$, e.g. 10$^2$ ml$^{-1}$ to 10$^5$ ml$^{-1}$. A concentration of bacteria of 10$^5$ ml$^{-1}$, 10$^4$ ml$^{-1}$, 10$^3$ ml$^{-1}$, 500 ml$^{-1}$, 200 ml$^{-1}$, 100 ml$^{-1}$, 50 ml$^{-1}$, 10 ml$^{-1}$, or 1 ml$^{-1}$ may be set as a detection limit, which, depending on the application, will activate an alarm. The alarm may also be set to take into consideration other parameters, such as the rate of increase in particle concentration. The microfluidic particle analysis device is not limited to analysing drinking water and microfluidic particle analysis device may also be used in e.g. food applications where the monitoring of cells and their concentration is relevant. Possible food applications are within the dairy industry and production of alcoholic beverages, e.g. beer, wine, cider, etc. The method of the invention is also relevant with process liquids from fermentations to produce biochemical or biological compounds. When the microfluidic particle analysis device of the invention monitors process liquids, particles, e.g. bacteria or yeast, or other production organisms, or contaminant cells, may be present at concentrations in the range of 10$^5$ ml$^{-1}$ to 10$^7$ ml$^{-1}$. The method may also be used to measure bacteria in a prepared sample, e.g. from a surface swab which has been suspended in a liquid. The very low detection limit, e.g. 10$^3$ ml$^{-1}$, 500 ml$^{-1}$, 200 ml$^{-1}$, 100 ml$^{-1}$, 50 ml$^{-1}$, 10 ml$^{-1}$, or 1 ml$^{-1}$, is particularly advantageous when the microfluidic particle analysis device is used for analysing a sample collected from a surface not expected or intended to contain bacteria, e.g. a "dean" surface.

In another aspect, the invention relates to a method of monitoring, e.g. measuring, the concentration of particles in a fluid. The method comprises providing a microfluidic particle analysis device according to the invention, providing a sample fluid containing particles having a dimension in the range of from 0.1 µm to 20 µm, applying a flow of the sample fluid from the inlet to the outlet of the microfluidic particle analysis device, monitoring, e.g. measuring, a concentration of the particles in the measuring channel using the sensor system for detecting a particle. It is also contemplated that the method can be used for larger particles, e.g. particles up to 100 µm in size. It is preferred that the microfluidic particle analysis device employed in this embodiment comprises a particle detection system for EIS as described above. It is particularly preferred that the particle detection system for EIS comprises electrodes set up to define an onset operating space and a balance operating space as described above. This aspect is particularly suited in fields where process fluids contain particles in the indicated size range. Exemplary particles are microbial cells, e.g. bacteria or yeasts, used in the fermentation of food products, e.g. dairy products or alcoholic beverages, or in fermentations to produce biochemical or biological compounds, e.g. pharmaceutical proteins or peptides, small molecules etc. When the microfluidic particle analysis device is designed for monitoring industrial fluids, e.g. fermentation broths, such as those from the production of beer, wine, dairy products, or other microbial fermentations, the concentration of particles, i.e. biological cells, is typically in the range of $10^5$ ml$^{-1}$ to $10^8$ ml$^{-1}$.

In general, the features outlined for the aspect relating to the microfluidic particle analysis device are also relevant for the method aspects of the invention, and vice versa. Any feature described in the context of any aspect may be used in any other aspect in combination with any other feature, and all such combinations are contemplated in the present invention even though the combinations may not be mentioned explicitly. In particular, any feature discussed for the aspect relating to the microfluidic particle analysis devices is also relevant for the method aspects of the invention.

BRIEF DESCRIPTION OF THE FIGURES

In the following the invention will be explained in greater detail with the aid of an example and with reference to the schematic drawings, in which FIG. 1 plots detection of particles as a function of flow velocity in the main channel in an embodiment of the microfluidic particle analysis device of the invention.

DETAILED DESCRIPTION OF THE INVENTION

Figure 1:
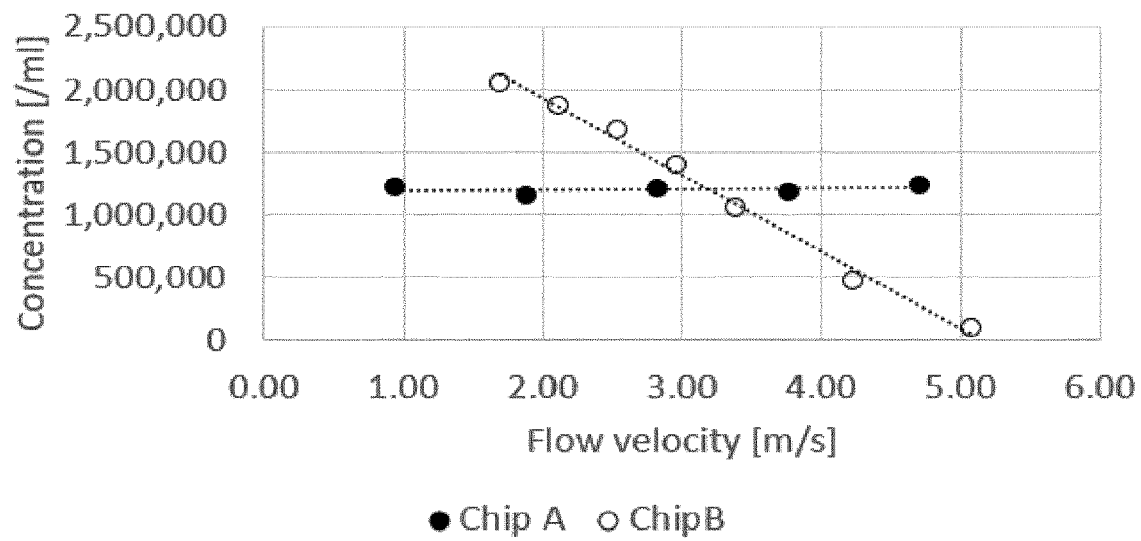

The present invention relates to a microfluidic particle analysis device comprising an inlet and an outlet in fluid communication via a main channel defining a main flow direction from an inlet end to an outlet end, the main channel being defined by a main channel wall extending from the inlet end to the outlet end and having a first cross-sectional dimension in the range of 20 µm to 120 µm and a second cross-sectional dimension of at least 100 µm, which main channel has a first vertex opposite a second vertex, which vertices are located opposite each other in the second cross-sectional dimension, the main channel wall at the first vertex and/or the second vertex having an opening extending along the main flow direction, and the main channel wall along the opening being open to an analysis section having a first surface opposite a second surface at an analytical distance in the range of 5 µm to 50 µm and a sensor system for detecting a particle. In a second aspect, the microfluidic particle analysis device comprises an inlet and an outlet in fluid communication via a main channel defining a main flow direction from an inlet end to an outlet end, the main channel being defined by a main channel wall extending from the inlet end to the outlet end and having a cross-sectional area in the range of 5,000 µm$^2$ to 38,000 µm$^2$ and a cross-sectional dimension in the range of 20 µm to 500 µm, the main channel having an opening extending along the main flow direction, and the main channel wall along the opening being open to an analysis section having a first surface opposite a second surface at an analytical distance in the range of 5 µm to 50 µm and a sensor system for detecting a particle. In another aspect the invention relates to a method of detecting a particle in a fluid using the microfluidic particle analysis device. In another aspect the invention relates to a method of monitoring the concentration of particles in a fluid using the microfluidic particle analysis device.

The microfluidic particle analysis device of the invention is particularly suited for detecting bacteria in drinking water, industrial process water, e.g.

Purified Water (PW), and other liquids of similar viscosity, especially aqueous liquids. Applications also include measuring bacteria in manually prepared aqueous solutions, such as bacteria in single urine samples, and bacteria in small volume samples containing bacteria from e.g. food products or food production equipment. Monitoring drinking water will generally comprise continuous monitoring of water from a source, which is distributed to an end user. The drinking water will be of low conductivity, e.g. <1 mS/cm, but the microfluidic particle analysis device may also be used with liquids of higher conductivity, e.g. process streams, such as fermentation broths, milk, beer, wine, etc., or lower conductivity, such as PW, e.g. for pharmaceutical production.

In the context of this invention the term "microfluidic" is intended to cover a range of sizes where the smallest dimension of channels is in the range from about 1 µm to about 1 mm, e.g. about 10 µm to about 200 µm, and in general the channels will not contain constrictions. It can generally be said that fluids in microfluidic fluidic systems will be flowing under laminar conditions, and fluidic systems with channels different from those defined above may well be described as "microfluidic" as long as fluids contained in the systems flow under laminar conditions.

In the context of the invention cross-sectional areas are generally denoted "µm$^2$". This unit represents the cross-section in µm×µm so that "µm$^2$" may be replaced with $10^{-12}$ m$^2$.

The microfluidic particle analysis device can also be referred to as a flow system, e.g. a "microfluidic particle flow analysis device". A "flow system", such as the microfluidic particle analysis device of the invention, may be operated continuously or in batch mode. For certain applications, e.g. monitoring of streams of liquid, such as drinking water or a process stream containing production cells, continuous flow is advantageous over batch wise analysis since a positive detection result can be obtained faster than when samples need to be extracted and analysed, e.g. the time between sampling is reduced to zero. When employed in batch mode the microfluidic particle analysis device of the present invention advantageously provides fast results for an analysed sample.

The microfluidic particle analysis device is a flow system where a flow of liquid enters the inlet and leaves the microfluidic particle analysis device via the outlet. Thus, the inlet and the outlet define a direction of the flow in the microfluidic particle analysis device, and in this context elements of the microfluidic particle analysis device may be "upstream" or "downstream" relative to each other with respect to the direction of flow.

The microfluidic particle analysis device comprises channels. In the context of the invention a channel may have any cross-sectional shape, e.g. the channel may be square, rectangular, round, etc. The microfluidic particle analysis device is not limited to channels of the same cross-sectional shape, and the cross-sectional shape of a single channel may vary over the length of the channel.

The microfluidic particle analysis device may comprise a pump, e.g. an external pump, for pushing liquid through the microfluidic particle analysis device via the inlet, and the microfluidic particle analysis device may also comprise an auxiliary pump, e.g. for aspirating liquid via the outlet. The pump may be any pump appropriate for the specific task, and exemplary pumps are a piston pump, a syringe pump, a peristaltic pump, a membrane pump, a diaphragm pump, a gear pump, a microannular gear pump, or any other appropriate type of pump.

The microfluidic particle analysis device may comprise a filtering unit. A "filtering unit" according to the present invention is to be understood in the broadest terms as a unit capable of separating solids, e.g. particles larger than particles intended for detection or quantification, and liquid. Thus, the filtering unit may be, e.g. a sieve, a packed bed of particles, a filter paper, a filter membrane etc.

Certain embodiments of the invention employ electrical impedance spectroscopy (EIS). EIS is generally well-known to the skilled person. Thus for example, Cheung et al. 2010 (*Cytometry Part A*, 2010, 77A: 648-666), describe EIS, in particular in the paragraph "Impedance Analysis as a Label-Free and Non-Invasive Technique" (p. 649), which is hereby incorporated by reference. Likewise, Houssin et al. (*IEEE SENSORS* 2009 *Conference*, 396-399), p. 397 in particular; Gawad et al. (*Lab Chip*, 2004, 4: 241-251); Cheung et al. 2005 (*Cytometry Part A*, 2005, 65A:124-132), in particular *Impedance Spectroscopy Flow Cytometry*, p. 125; and David et al. (*Biotechnology and Bioengineering*, 2011, 109: 483-492), all describe EIS and all are hereby incorporated by reference.

Figure 2:
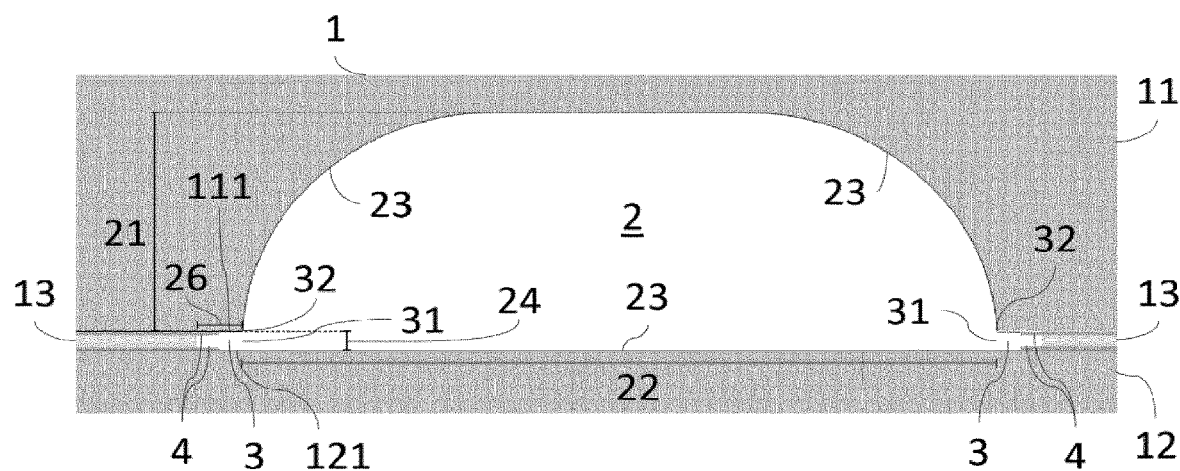
FIG. 2 shows cross-sectional view of the main channel and analysis section of an embodiment of the microfluidic particle analysis device of the invention.
Figure 3:
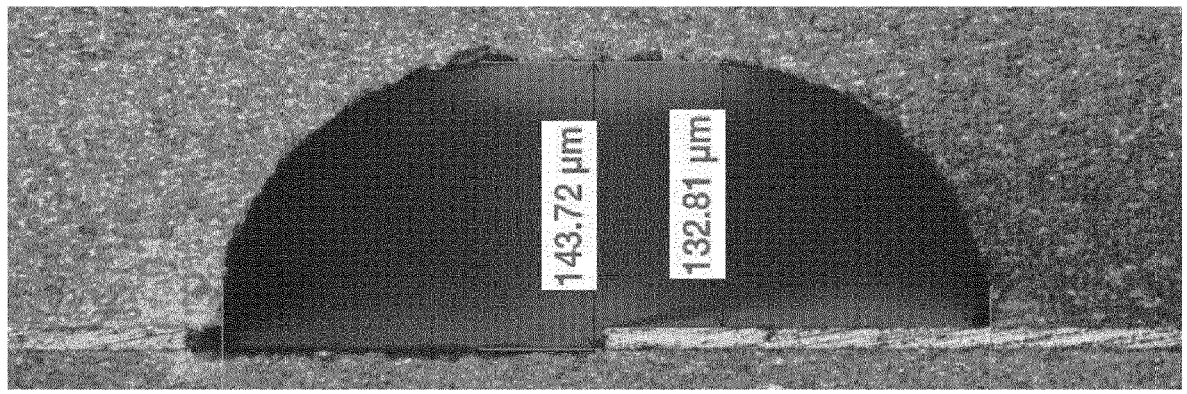
FIG. 3 shows a photomicrograph of the cross-section of the main channel of an embodiment of the microfluidic particle analysis device of the invention.
Figure 4:
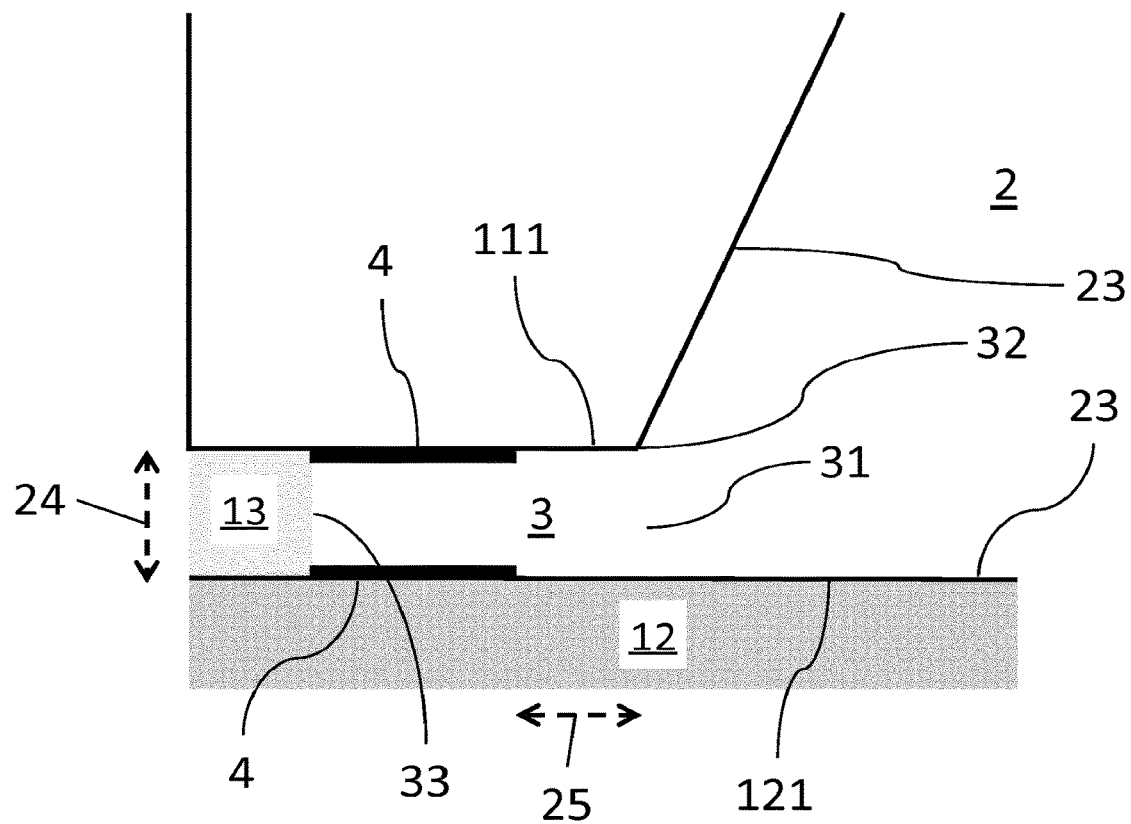
FIG. 4 shows an analysis section in an embodiment of the microfluidic particle analysis device of the invention.
Figure 5:
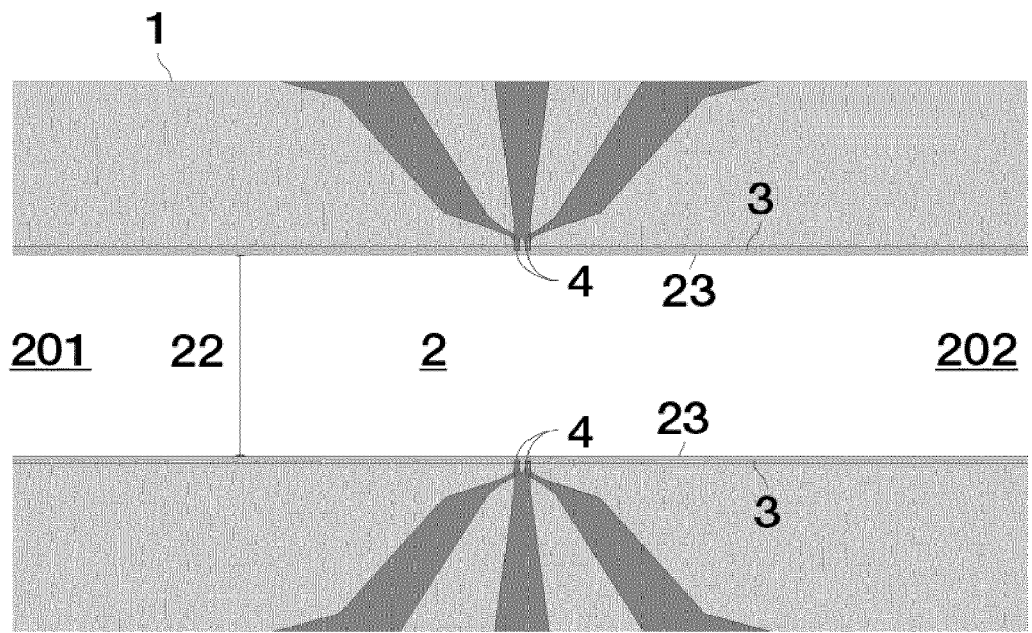
FIG. 5 shows a top view of the microfluidic particle analysis device of the invention.
Figure 6:
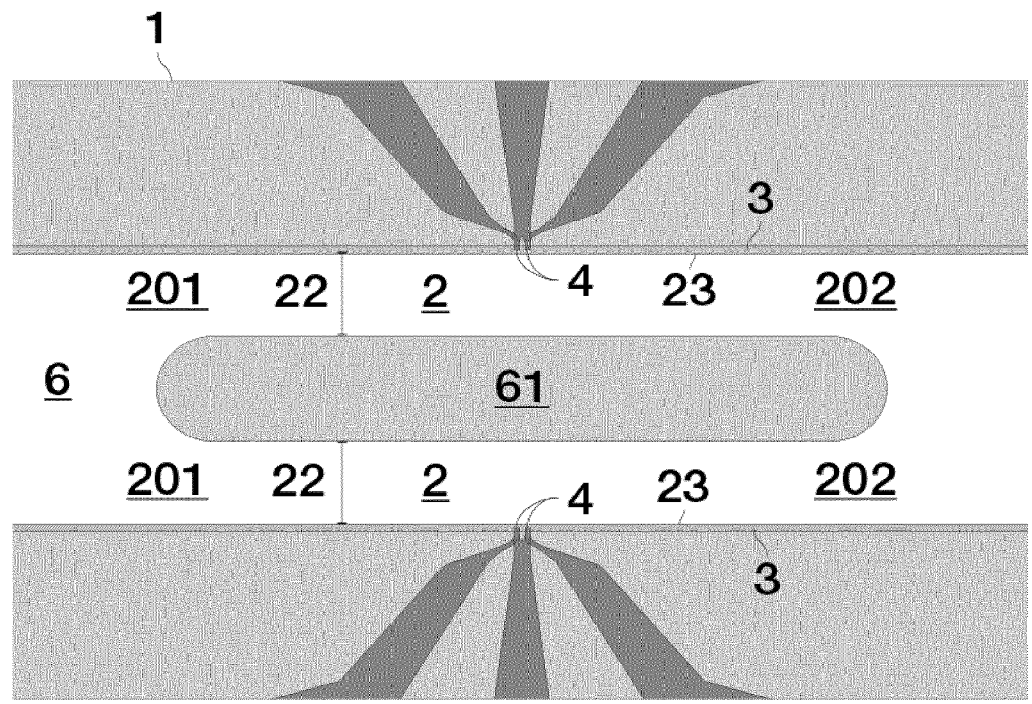
FIG. 6 shows a top view of an embodiment of the microfluidic particle analysis device of the invention.

A cross-section of an embodiment of the microfluidic particle analysis device 1 is illustrated schematically in FIG. 2, which shows the main channel 2 having a first cross-sectional dimension 21 of 120 µm and a second cross-sectional dimension 22 of 350 µm. FIG. 2 is not, however, drawn to scale but is a schematic representation of the features of the microfluidic particle analysis device. A photomicrograph of a cross-section of the main channel 2 corresponding to that of FIG. 2 is shown in FIG. 3. FIG. 4 shows a cross-section of an analysis section 3 of an embodiment of the microfluidic particle analysis device 1 of the invention. FIG. 2, FIG. 3 and FIG. 4 show the cross-section of the microfluidic particle analysis device 1 in a plane normal to the main flow direction. A top view of the microfluidic particle analysis device 1 is shown in FIG. 5. A top view of another embodiment of the microfluidic particle analysis device 1 is shown in FIG. 6.

The microfluidic particle analysis device 1 may be assembled from a top substrate 11, e.g. a glass wafer, containing the main channel 2 and a bottom substrate 12, e.g. a glass wafer, with a polymer layer 13 between the top substrate 11 and the bottom substrate 12. An appropriate channel structure may be formed in the polymer layer 13 using photolithography or any other procedure, e.g. laser ablation. For example, a section may be removed from a polymer sheet or the like to provide the polymer layer 13 where the removed part represents the main channel 2 with room for the analysis section 3.

The main channel 2 has a main channel wall 23. The analysis section 3 is thus created in the space between the top substrate 11 and the bottom substrate 12, so that the thickness of the polymer layer 13 represents the analytical distance 24 between the first surface 111 opposite the second surface 121, which are located in the surfaces 111, 121 of the top substrate 11 and the bottom substrate 12, respectively. Likewise, the opening 31 in the main channel wall 23 is also provided by the polymer layer 13 so that the opening 31 is located in vertex 32 of the main channel 2. In this design, the microfluidic particle analysis device 1 appropriately has two analysis sections 3, each located in a vertex 32 of the main channel 2.

FIG. 5 shows a top view of the microfluidic particle analysis device 1. The microfluidic particle analysis device 1 has a main channel 2 with an inlet end 201 and an outlet end 202 and openings 31 at two opposite vertices 32 extending from the inlet end 201 to the outlet end 202. At each opening 31 is an analysis section 3.

The top view in FIG. 6 shows a microfluidic particle analysis device 1 having a supply channel 6, which is divided into two main channels 2 each with an analysis section 3 located at openings 31 in the main channel wall 23. FIG. 6 shows the supply channel 6, the main channels 2, the inlet ends 201 and the outlet ends 202 of the main channels 2; in FIG. 6 the second cross-sectional dimensions 22 of the two main channels 2 are illustrated as identical although the second cross-sectional dimension 22 of one main channel 2 may be different from the second cross-sectional dimension 22 of the other main channel 2. In the embodiment of FIG. 6, the extension of the opening 31 corresponds to the distance from the inlet end 201 to the outlet end 202. In FIG. 6 the supply channel 6 is divided into the two main channels 2 by a distribution structure 61. A supply channel 6 with a distribution structure 61 is considered not to represent a manifold in the context of the invention.

Appropriate channels may be created in either or both of the top substrate 11 and the bottom substrate 12 using any appropriate technology, e.g. by etching the main channel 2 into a glass substrate 12 using a standard hydrofluoric acid (HF)-etching process or by laser ablation or micromilling of an appropriate substrate. When a channel is created in a substrate 12 using either of the above-mentioned technologies the cross-section of the channel will typically have rounded corners, e.g. as illustrated in FIG. 2 and FIG. 3. However, rounded corners in a main channel 2 have no relevance for the flow of a liquid through the main channel 2. In particular, when the analysis section 3 is created between two planar substrates 11, 12 using a polymer layer 13, the analysis section 3 will have a first surface 111 opposite a second surface 121, which surfaces 111, 121 are parallel with each other, and which analysis section 3 generally has a rectangular cross-section. When the microfluidic particle analysis device 1 comprises a supply channel 6 with a distribution structure 61, the distribution structure 61 may be created by not etching the corresponding section or by laser ablating or micromilling the channel structure to include the distribution structure 61.

The channel structure created in the polymer layer 13 will, when the polymer layer 13 is assembled with the top substrate 11 and the bottom substrate 12, define both the main channel 2, the analysis section(s) 3, the opening 31 in the main channel wall, e.g. at the vertex 32 of the main channel 2, and the back wall 33 of the analysis section 3. The distance 26 between the opening 31 in the main channel wall 23 and the back wall 33 is in the range of 10 μm to 50 μm.

An optical sensor system for detecting a particle (not shown) using e.g. a laser as a light source and an appropriate detector may be integrated with the top substrate 11 and the bottom substrate 12 so that the laser light penetrates the analysis section 3.

In a preferred embodiment, the microfluidic particle analysis device 1 employs EIS principles for detecting a particle 5. The electrodes 4, e.g. the reference electrode and the excitation electrode, may both be contained on the surface 111 of either the top substrate 11 or the surface 121 of the bottom substrate 12 to prepare a microfluidic particle analysis device 1 having an EIS based sensor system for detecting a particle using coplanar electrodes 4.

Alternatively, electrodes 4 may be contained in the surface 111 of the top substrate 11 and the surface 121 of the bottom substrate 12 so that an EIS based sensor system for detecting a particle using electrodes 4 arranged in a parallel overlap set-up is provided. The perpendicular distance 25 from the opening 31 in the main channel wall 23 in the depicted embodiment is about 5 μm.

In a first process step electrodes 4 are deposited onto a bottom substrate 12 in order to produce a microfluidic particle analysis device 1 having coplanar electrodes 4, or the electrodes 4 are deposited onto a bottom substrate 12 and a top substrate 11 in order to produce a microfluidic particle analysis device 1 having parallel overlapping electrodes 4. The electrodes 4 can be made, e.g. in a cleanroom, using a standard lift-off process with e-beam deposition of the electrode metals, e.g. Ti as adhesive layer and Au or Pt as conductive layer. The total thickness of the electrodes is usually between 100 and 200 nm.

In a second process step a standard HF-etch process is used to define the main channel 2 in either or both the bottom substrate 12 and the top substrate 11.

A backside protection layer is applied to the substrates 11, 12 and a standard photolithography process is used to define a mask with an etchant opening. Due to depth of the HF-etch it is advantageous to use a metal as a masking material, however, in order to protect the electrodes 4 during the metal mask stripping, a thin intermediate photoresist layer between the metal mask and substrate can also be used. As an HF-etching process is an isotropic etch, the width of the main channel 2 will be equal to the etching depth plus the mask opening. When the main channel 2 has been defined in the borosilicate substrate, the masking materials can be stripped accordingly.

A further process step may involve creation of the inlet and outlet holes (not shown) on the top substrate 11, e.g. using powder blasting or any other appropriate technique. Powder blasting of holes in glass substrates within microfluidics is well-known to the skilled person. A mask made from photoresist can be used to protect the electrodes and everything except for the inlet and outlet holes. This will provide a microfluidic particle analysis device 1 where the main channel is in fluid communication with the inlet via a channel (not shown), which is orthogonal to the plane of the planar design. When the inlet is in plane with the planar design of the main channel 2 the process step of creation of inlet and outlet holes on the top substrate 11 is typically not employed.

In a third process step, the photoresist in which the channels are defined is patterned and deposited. For practical reasons the photoresist is typically applied to the bottom planar substrate using either spin- or spray-coating. Alternatively, the photoresist can also be laminated onto the substrate with a dry-film photoresist. In a specific fabrication process the photoresist is laminated onto the bottom substrate 12. The photoresist is patterned using a standard photolithography process with UV-exposure and development in an alkaline solution.

In a fourth process step the top substrate 11 and bottom substrate 12 are aligned and bonded. The bonding process can be made prior to, or after, dicing. In a specific embodiment it is a direct bonding, in which the top substrate 11 and bottom substrate 12 are aligned and subjected to high temperature and pressure to seal the microfluidic channel. If the bonding process has been made prior to dicing, which is the most beneficial batch method, the final step is to dice the bonded wafers into separate chips.

The microfluidic particle analysis device 1 may now be finalised by connecting external components, e.g. tubes, pumps and electrical parts as appropriate.

Figure 7:
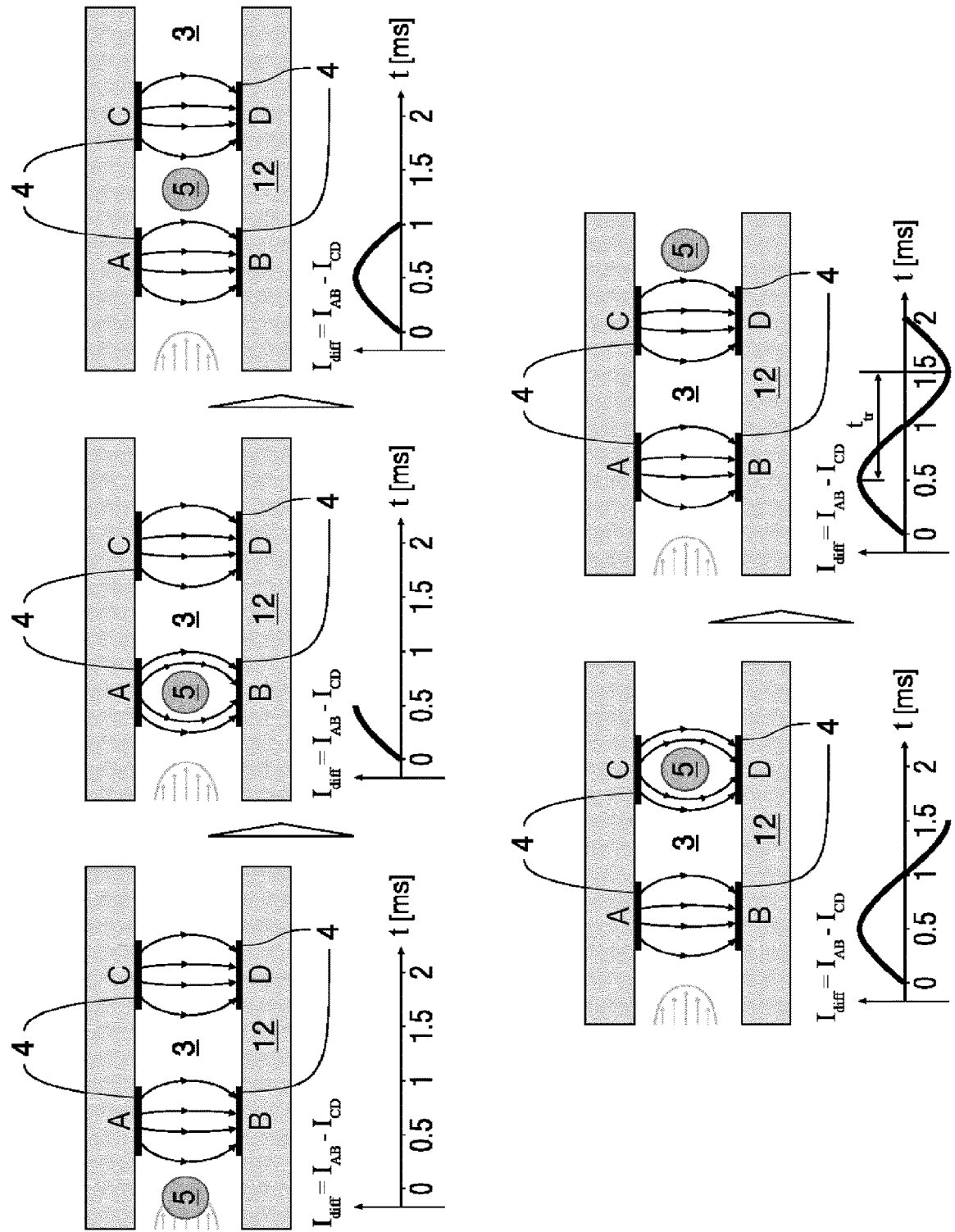
FIG. 7 illustrates electrodes in a parallel overlap of an embodiment of the invention.

In a preferred embodiment the electrodes are arranged in a parallel overlap set-up, wherein the sensor system for detecting a particle comprises an excitation electrode 4 on the first surface 111 of the analysis section and a reference electrode 4 on the second surface 121 of the analysis section, as illustrated in FIG. 7; in FIG. 7 the electrodes are specified with an additional label, "A" to "D". In this embodiment, the microfluidic particle analysis device comprises a first excitation electrode A facing an opposite first reference electrode B. Additionally, a second excitation electrode C opposite a second reference electrode D is located downstream of the first excitation electrode A and the first reference electrode B. A voltage, e.g. as a direct current, is applied to the excitation electrodes A, C and a current is measured at the two reference electrodes B, D. The signals from the two reference electrodes B, D are subtracted ($I_{diff}=I_{AB}-I_{CD}$) in order to obtain a characteristic transition signal as illustrated in FIG. 7. When no particle 5 is present between the electrodes A-B or C-D the measured current is equal at electrode A and B ($I_{AB}=I_{CD}$), and the differential signal is therefore zero ($I_{diff}=0$). As the particle 5 moves into the volume between the upstream excitation electrode A and its reference electrode B, i.e. the operating space, the signal measured on the upstream reference electrode B changes. The signal on the downstream reference electrode D will, however, not change and the differential current will be different from zero ($I_{diff}\neq0$). The maximum differential current is measured when the particle is positioned exactly between the upstream excitation electrode A and its reference electrode B. When the particle is exactly in-between the A and B electrodes and the C and D electrodes in the flow stream direction, the measured signals will again be equal ($I_{diff}=0$). The minimum differential current is measured when the particle is positioned between excitation electrode C and its reference electrode D.

Figure 8:
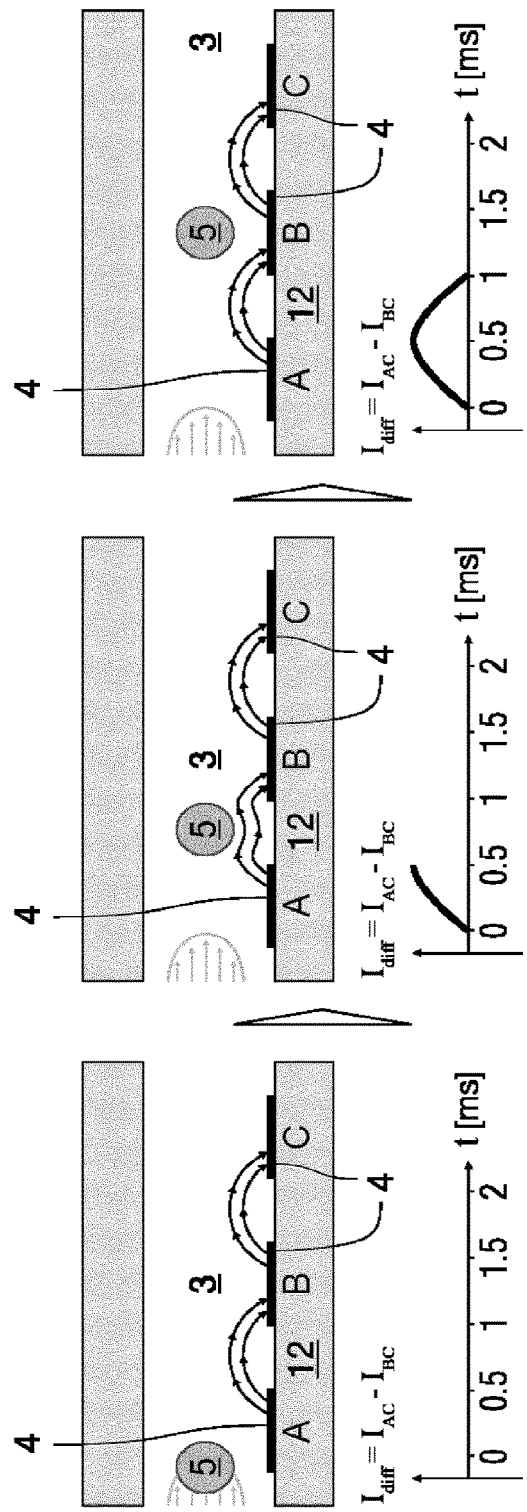
FIG. 8 illustrates electrodes in a coplanar layout of an embodiment of the invention.
Figure 8:
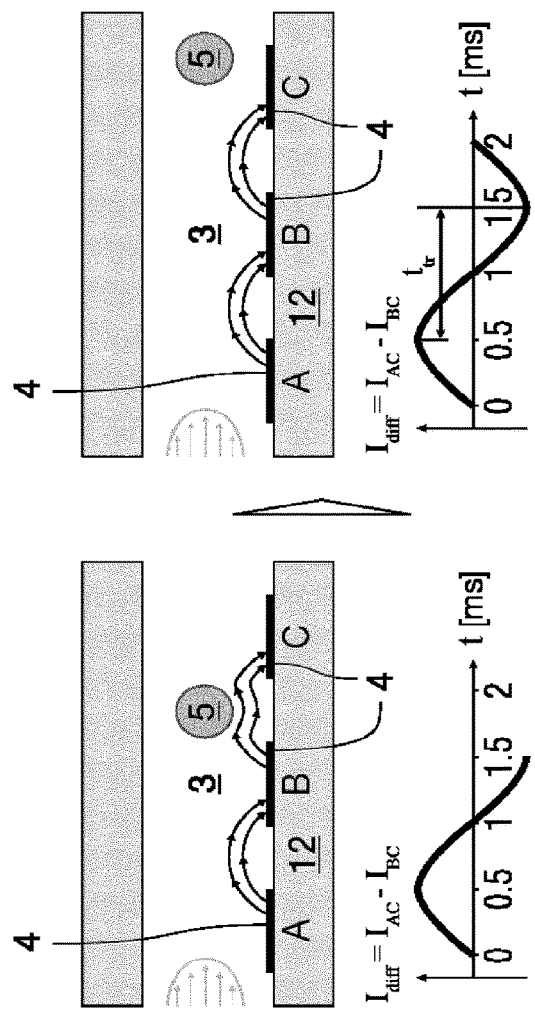

In a specific embodiment the electrodes are arranged in a coplanar set-up, and the microfluidic particle analysis device comprises a first excitation electrode located between two reference electrodes as illustrated in FIG. 8. A voltage is applied to the excitation electrode C and a current is measured at the two reference electrodes A, B. The signals from the two reference electrodes A, B are subtracted ($I_{diff}=I_{AC}-I_{BC}$) in order to obtain a characteristic transition signal as illustrated in FIG. 8. When no particle is present between the electrodes the measured current is equal at electrode A and B ($I_{AC}=I_{BC}$), and the differential signal is therefore zero ($I_{diff}=0$). As the particle 5 moves into the volume between the upstream reference electrode A and the excitation electrode C, i.e. the operating space, the signal measured on the upstream reference electrode A changes. The signal on the downstream reference electrode B will, however, not change and the differential current will be different from zero ($I_{diff} \neq 0$). The maximum differential current is measured when the particle is positioned exactly between the upstream reference electrode A and the excitation electrode C. When the particle is exactly above the centre of excitation electrode C, the measured signals will again be equal ($I_{diff}=0$). The minimum differential current is measured when the particle is positioned exactly between excitation electrode C and downstream reference electrode B.

The magnitude and shape of the transition signal at several frequencies is used to characterise the particle properties and sample features thus determining the type of particles 5 in the sample. Additionally, the transition signal can be used to determine the velocity with which the particle moves across the electrodes 4, by considering the length the particle has moved and the time of the transition. The time can be determined directly from the transition signal by evaluating the time from the maximum peak to the minimum peak. The distance travelled by the particle 5 is evaluated by considering two things. First of all, the width of the electrodes 4 and the distance between them, which are specific dimensions chosen during the design of the microfluidic particle analysis device 1 and are very well defined. Secondly, due to the microscopic dimensions of the channel, the flow in the channel is laminar. This means that the particle 5 will stay in the same position in the channel, e.g. the analysis section 3, during a transition, and will move in a straight line across the electrodes 4. Thus, by determining the time between the maximum and minimum differential current and the physical distance that the particle 5 has travelled, the exact velocity of the particle 5 can be calculated (see FIG. 7 and FIG. 8). By evaluating the flow velocity of the particles 5 and using the well-defined channel dimensions one can easily determine the flow rate in the analysis section 3, as the particles 5 will follow the flow in the analysis section 3 under any given condition presented within this invention.

The microfluidic particle analysis device 1 may be fabricated using any appropriate technology, but it is preferred that the microfluidic particle analysis device 1 is fabricated using cleanroom facilities due to the small critical dimensions of the main channel 2 and the analysis section 3. The fabrication process may thus involve standard fabrication procedures such as an electrode lift-off process, photolithography and direct bonding, as are well-known to the skilled person.

The invention will now be explained in the following non-limiting examples. As will be evident to the skilled person variations are possible without deviating from the invention.

EXAMPLE

A microfluidic particle analysis device of the invention was prepared as described above. The main channel had a first cross-sectional dimension of 100 µm and a largest second cross-sectional dimension of 220 µm in a plane normal to the main flow direction. The main channel wall had an opening in a vertex to the analysis section where the first and second surfaces, at the surfaces of the top and bottom substrates, respectively, had an analytical distance of 10 µm. The top and bottom substrates were fitted with two sets of electrodes to provide an analysis section having the electrodes in the parallel overlap set-up; the distance between the two sets was 16 µm from electrode edge to electrode edge in the flow direction. The cross-section of the main channel, including the analysis section, is depicted in FIG. 3.

For comparison, a microfluidic particle analysis device having a main channel had a first cross-sectional dimension of 135 µm and a largest second cross-sectional dimension of 350 µm in a plane normal to the main flow direction was also prepared as described above. Thus, this device was not according to the invention. The comparative device had an analysis section as the microfluidic particle analysis device of the invention.

In both devices the opening had a length of 1800 µm, and the distance from the inlet end to the outlet end of the main channel was 1800 µm.

It is expected that the flowrate in the analysis section is proportionally linearly dependent on the flowrate in the main channel (i.e. doubling the flowrate in the main channel should double the flowrate in the analysis section).

When a particle passes between an electrode set the current running between the electrodes will change (lower or higher current depending on the type of particle). This change in current results in a characteristic peak in current when the particle is located with equivalent vertical (flow direction) distance to the edges of the electrode.

Due to the placements of the electrodes in the analysis section it is possible to determine the velocity of the flow passing between the electrodes. This is done by measuring the time between peak current from the two electrode sets; this is called the transition time. Because the analytical distance between electrodes ($d_{electrodes}$) is known, the transition time ($t_{transition}$) can be used to calculate the velocity of the particle ($V_{particle}$) according to Equation 4.

$$V_{particle} = \frac{d_{electrodes}}{t_{transition}} \qquad \text{Equation 4}$$

Because the flow in the analysis section is laminar and the mass of the particles are negligible, the velocity of the liquid (flow velocity) can be assumed to be equal to the particle velocity. In turn, the flow velocity is linearly dependent on the volumetric flowrate (in the area where that flow velocity is relevant).

In order for a microfluidic device to be useful as a particle sensor, e.g. for bacteria, such as for detecting single bacteria or other cells, the number of particles that pass through the analysis section during any given time period must correspond proportionally to the particle concentration in the entire channel at all relevant flow velocities, and furthermore the flow in all regions should be laminar. To test the linearity of the concentration with flow rate, a sample containing 2 µm polystyrene beads was injected through the microfluidic devices. Volumetric flowrates of up to 12 ml/min were employed and the Reynolds numbers were calculated for the main channels of the two devices according to Equation 5:

$$Re = \frac{Q D_H}{v A} \quad \text{Equation 5}$$

where Q is the volumetric flow rate, $D_H$ is the hydraulic diameter of the main channel, v is the kinematic viscosity and A is the cross-sectional area of the main channel. The Reynolds numbers and particle Reynolds numbers (in the main channel) for the two microfluidic devices are indicated in Table 1.

TABLE 1

Reynolds numbers and particle Reynolds numbers for microfluidic devices

| Microfluidic particle analysis device of the invention | | | Comparative microfluidic device | | |
|---|---|---|---|---|---|
| Flowrate [ml/min] | Re | $Re_p$ (for a 2 μm particle) | Flowrate [ml/min] | Re | $Re_p$ (for a 2 μm particle) |
| 1 | 120 | 0.0295 | 4 | 313 | 0.0366 |
| 2 | 240 | 0.0589 | 5 | 391 | 0.0458 |
| 3 | 360 | 0.0884 | 6 | 470 | 0.0549 |
| 4 | 480 | 0.1178 | 7 | 548 | 0.0641 |
| 5 | 600 | 0.1473 | 8 | 627 | 0.0733 |
| | | | 10 | 783 | 0.0916 |
| | | | 12 | 939 | 0.1099 |

Under all conditions tested in the two microfluidic devices the Reynolds numbers indicated laminar flow, and the particle Reynolds number indicate there is no flow focusing for spherical particles with a diameter of 2 μm.

Figure 9:
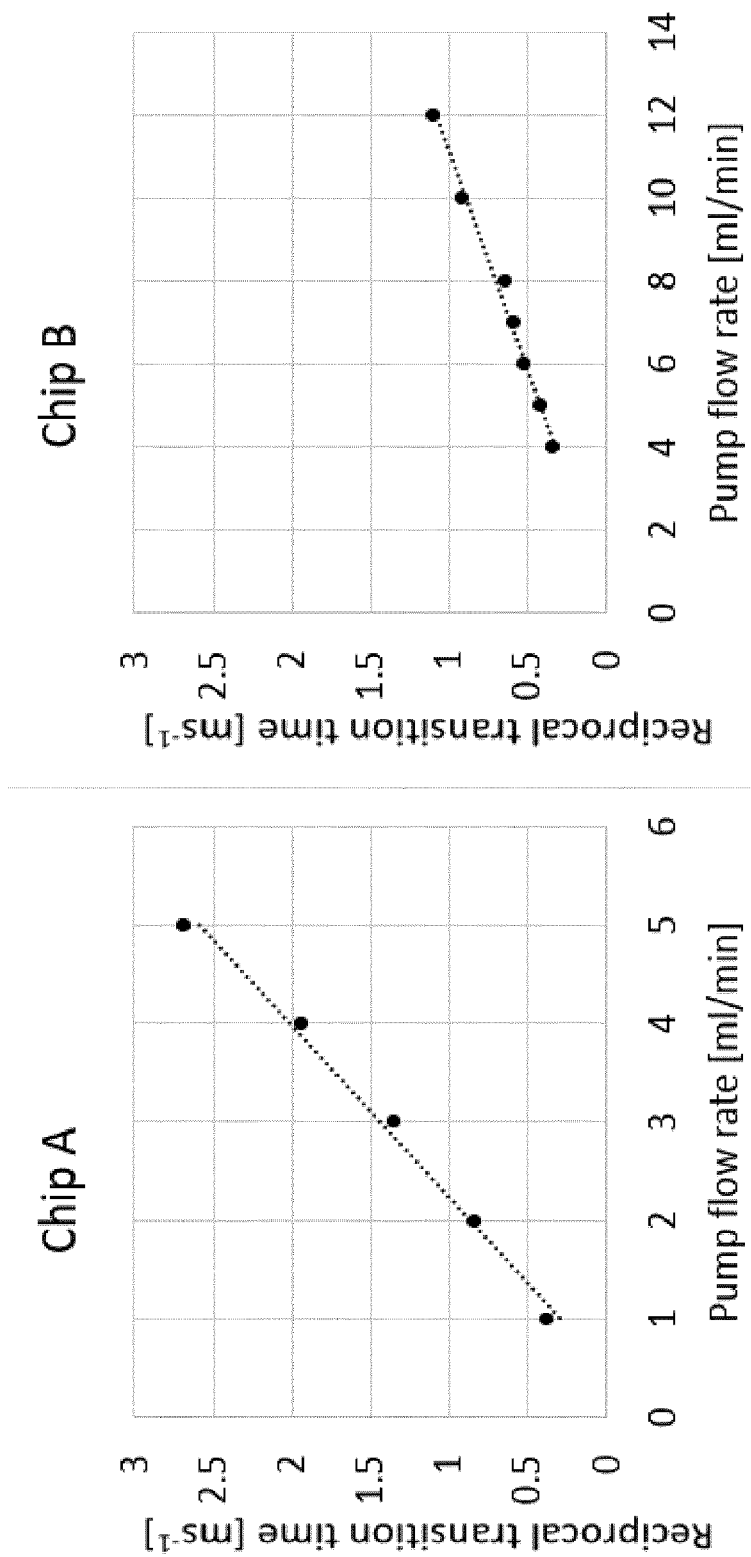
FIG. 9 compares the transition time in the analysis section as a function of system flow rate in a microfluidic particle analysis device of the invention with a comparative device.

The reciprocal transition time can be used as an indicative measure of the flowrate in the analysis section. FIG. 9 compares the reciprocal transition times for the two microfluidic devices and shows that the reciprocal transition time is proportional to pump flow rate for both microfluidic devices (in FIG. 9 the microfluidic particle analysis device of the invention is labelled "Chip A", and the comparative microfluidic particle device is labelled "Chip B"). This suggests that the amount of liquid that enters the analysis section is proportionally and linearly dependent on the system flow rate as expected, and that the issues with varying concentration measurements in chip B has to do with the particles not entering the measurement area.

Surprisingly, the experimental results (illustrated in FIG. 1, in which microfluidic particle analysis device of the invention is likewise labelled "Chip A", and the comparative microfluidic particle device is also labelled "Chip B") show that the linearity of the measured particle concentration with flow rate is not guaranteed even when the Reynolds number suggests that the flow is well into the laminar region (Re<2300), and when the particle Reynolds number indicates that there should be no particle focusing. Thus, in the microfluidic particle analysis device the concentration of particles detected in the sensor system was independent of flow rate, whereas in the comparative microfluidic device the number of particles depended significantly on the flow rate. In particular, the flow rates in FIG. 1 are the linear flow rates in the main channel so that the flow rates are directly comparable for the two microfluidic devices.

Further microfluidic devices were prepared and tested for signal dependency on the flow rate. The observations are summarised in Table 2.

TABLE 2

Signal dependency on flow rate

| First cross-sectional dimension [μm] | Second cross-sectional dimension [μm] | Cross-sectional area [μm²] | Signal independent on flow rate? |
|---|---|---|---|
| 200 | 830 | 148,800 | No |
| 110 | 350 | 33,399 | Yes |
| 160 | 350 | 45,000 | No |
| 135 | 350 | 39,400 | No |
| 100 | 220 | 17,700 | Yes |

The invention claimed is:

1. A microfluidic particle analysis device comprising an inlet and an outlet in fluid communication via a main channel defining a main flow direction from an inlet end to an outlet end, the main channel being defined by a main channel wall extending from the inlet end to the outlet end and having a cross-sectional area in the range of 5,000 μm² to 38,000 μm² and a cross-sectional dimension in the range of 20 μm to 500 μm, the main channel wall having an opening extending along the main flow direction, which main channel wall along the opening is open to an analysis section having a first surface opposite a second surface at an analytical distance in the range of 5 μm to 50 μm and a sensor system for detecting a particle, which analysis section has a back wall at opposite the opening in the main channel wall, wherein the distance between the opening in the main channel wall and the back wall is in the range of 10 μm to 50 μm.

2. The microfluidic particle analysis device according to claim 1, wherein the sensor system for detecting a particle comprises a first electrode and a second electrode defining an operating space between the first electrode and the second electrode, which first and second electrodes are in electrical connection via an electric circuit comprising an alternating current (AC) source or a direct current (DC) source and a device for monitoring an electrical signal from the first electrode and/or the second electrode.

3. The microfluidic particle analysis device according to claim 2, wherein the first electrode is an excitation electrode located on the first or the second surface of the analysis section, and the second electrode comprises is a pair of reference electrodes located on the same surface as the first electrode, and the excitation electrode is located between the reference electrodes; or wherein the first electrode is an excitation electrode on the first surface of the analysis section and the second electrode is a reference electrode on the second surface of the analysis section; or wherein the first electrode is an excitation electrode on the second surface of the analysis section and the second electrode is a reference electrode on the first surface of the analysis section.

4. The microfluidic particle analysis device according to claim 3, wherein a perpendicular distance from the opening in the main channel wall to the excitation electrode and to the reference electrode or to the reference electrodes is at least 5 μm.

5. The microfluidic particle analysis device according to claim 1, wherein the opening extends from the inlet end to the outlet end, or wherein the opening has a length in the main flow direction in the range of 10 μm to 5000 μm.

6. The microfluidic particle analysis device according to claim 1, wherein the distance from the inlet end to the outlet end is in the range of 200 μm to 30,000 μm.

7. The microfluidic particle analysis device according to claim 1, wherein the microfluidic particle analysis device comprises a supply channel in fluid communication with the inlet end of the main channel and an exit channel in fluid communication with the outlet end of the main channel.

8. The microfluidic particle analysis device according to claim 1, wherein the microfluidic particle analysis device does not comprise a section where the main channel is divided into two or more separate channels.

9. A method of detecting a particle in a fluid, the method comprising:
providing a microfluidic particle analysis device comprising an inlet and an outlet in fluid communication via a main channel defining a main flow direction from an inlet end to an outlet end, the main channel being defined by a main channel wall extending from the inlet end to the outlet end and having a first cross-sectional area in the range of 5,000 μm$^2$ to 38,000 μm$^2$ and a cross-sectional dimension in the range of 20 μm to 500 μm, the main channel wall having an opening extending along the main flow direction, which main channel wall along the opening is open to an analysis section having a first surface opposite a second surface at an analytical distance in the range of 5 μm to 50 μm and a sensor system for detecting a particle, which analysis section has a back wall at opposite the opening in the main channel wall, wherein the distance between the opening in the main channel wall and the back wall is in the range of 10 μm to 50 μm,
providing a sample fluid suspected of containing a particle having a dimension in the range of from 0.1 μm to 20 μm,
applying a flow of the sample fluid from the inlet to the outlet of the microfluidic particle analysis device,
detecting a particle in the analysis section using the sensor system for detecting a particle.

10. The method of detecting a particle in a fluid according to claim 9, wherein the sensor system for detecting the a particle comprises a first electrode and a second electrode defining an operating space between the first electrode and the second electrode, which first and second electrodes are in electrical connection via an electric circuit comprising an alternating current (AC) source direct current (DC) source and a device for monitoring an electrical signal from the first electrode and/or the second electrode, and the method comprises applying an AC current from the alternating current source or a DC current from the direct current source to create an electric field in the operating space, and monitoring a differential electrical signal between the first electrode and the second electrode.

11. The method of detecting a particle in a fluid according to claim 9, wherein the concentration of particles in the sample fluid is in the range of 0 ml$^{-1}$ to 10$^8$ ml$^{-1}$.

12. The method of detecting a particle in a fluid according to claim 9, wherein a volumetric flow in the range of from 30 μl/min to 30 ml/min is applied to the inlet of the microfluidic particle analysis device.

13. A method of monitoring the concentration of particles in a fluid, method comprises
providing a microfluidic particle analysis device comprising an inlet and an outlet in fluid communication via a main channel defining a main flow direction from an inlet end to an outlet end, the main channel being defined by a main channel wall extending from the inlet end to the outlet end and having a first cross-sectional area in the range of 5,000 μm$^2$ to 38,000 μm$^2$ and a cross-sectional dimension in the range of 20 μm to 500 μm, the main channel wall having an opening extending along the main flow direction, which main channel wall along the opening is open to an analysis section having a first surface opposite a second surface at an analytical distance in the range of 5 μm to 50 μm and a sensor system for detecting a particle, which analysis section has a back wall at opposite the opening in the main channel wall, wherein the distance between the opening in the main channel wall and the back wall is in the range of 10 μm to 50 μm,
providing a sample fluid containing particles having a dimension in the range of from 0.1 μm to 20 μm,
applying a flow of the sample fluid from the inlet to the outlet of the microfluidic particle analysis device,
measuring a concentration of the particles in the analysis section using the sensor system for detecting a particle.

14. The method of monitoring the concentration of particles in a fluid according to claim 13, wherein the sensor system for detecting the a particle comprises a first electrode and a second electrode defining an operating space between the first electrode and the second electrode, which first and second electrodes are in electrical connection via an electric circuit comprising an alternating current (AC) source or a direct current (DC) source and a device for monitoring an electrical signal from the first electrode and/or the second electrode, and the method comprises applying an AC current from the alternating current source or a DC current from the direct current source to create an electric field in the operating space, and monitoring a differential electrical signal between the first electrode and the second electrode.

15. The method of monitoring the concentration of particles according to claim 13, wherein the concentration of particles in the sample fluid is in the range of 0 ml$^{-1}$ to 10$^8$ ml$^{-1}$.

16. The method of monitoring the concentration of particles according to claim 13, wherein a volumetric flow in the range of from 30 μl/min to 30 ml/min is applied to the inlet of the microfluidic particle analysis device.

* * * * *